US012791068B2

(12) United States Patent
Caudill

(10) Patent No.: US 12,791,068 B2
(45) Date of Patent: Nov. 10, 2026

(54) MODULAR PORTAL BOX WET BRAKE

(71) Applicant: Super ATV, LLC, Madison, IN (US)

(72) Inventor: Brent Caudill, North Vernon, IN (US)

(73) Assignee: Super ATV, LLC, Madison, IN (US)

( * ) Notice: Subject to any disclaimer, the term of this patent is extended or adjusted under 35 U.S.C. 154(b) by 371 days.

(21) Appl. No.: 18/416,173

(22) Filed: Jan. 18, 2024

(65) Prior Publication Data

US 2025/0237275 A1 Jul. 24, 2025

(51) Int. Cl.

| | |
|---|---|
| ***B60B 27/00*** | (2006.01) |
| ***B60B 35/14*** | (2006.01) |
| ***B60K 17/04*** | (2006.01) |
| ***B60T 1/06*** | (2006.01) |
| ***F16D 55/40*** | (2006.01) |

(Continued)

(52) U.S. Cl.

CPC .......... *F16D 55/40* (2013.01); *B60B 27/0021* (2013.01); *B60B 27/0052* (2013.01); *B60K 17/043* (2013.01); *B60T 1/065* (2013.01); *F16D 65/853* (2013.01); *F16H 57/02* (2013.01); *B60B 2900/5118* (2013.01); *F16D 2121/04* (2013.01); *F16D 2125/08* (2013.01);

(Continued)

(58) Field of Classification Search

CPC . B60B 27/00; B60B 27/0015; B60B 27/0021; B60B 27/0047; B60B 27/0052; B60B 27/0057; B60B 27/0063; B60B 27/0073; B60B 35/12; B60B 35/14; B60B 2900/511; B60B 2900/5118; B60K 17/043; B60T 1/02; B60T 1/06; B60T 1/062; B60T 1/065; F16D 2121/02; F16D 2121/04; F16D 2121/06; F16D 2121/16; F16D 2121/22; F16D 2125/08; F16H 57/02; F16H 57/02026; F16H 57/02052; F16H 57/02056

USPC .......................................................... 180/371

See application file for complete search history.

(56) References Cited

U.S. PATENT DOCUMENTS

| | | | |
|---|---|---|---|
| 3,420,327 | A | 1/1969 | Nallinger |
| 3,822,757 | A | 7/1974 | Spence |

(Continued)

FOREIGN PATENT DOCUMENTS

| | | | |
|---|---|---|---|
| CN | 203727102 | 7/2014 | |
| CN | 107487175 B * | 12/2019 | ............. B60K 17/12 |

(Continued)

OTHER PUBLICATIONS

Machine translation of CN203727102U by EPO Patent Translate on May 15, 2024 (pp. 12).

*Primary Examiner* — Daniel M. Keck
(74) *Attorney, Agent, or Firm* — Woodard, Emhardt, Henry, Reeves & Wagner, LLP

(57) ABSTRACT

A modular portal lift assembly is configured to couple to an axle and a wheel of a vehicle so as to raise the ground clearance. The portal lift assembly includes a portal box and a brake module. The brake module is configured to couple to the portal box and is removable the portal lift assembly. The portal box and the brake module each define a housing that encloses an interior volume. The portal lift assembly is configured to separate the interior volume of the portal box and the interior volume of the brake module. Further, the portal box defines a recess that is configured to receive the brake module. When the brake module is coupled to the portal box, the brake module is positioned in the recess.

21 Claims, 13 Drawing Sheets

(51) Int. Cl.

| | |
|---|---|
| ***F16D 65/853*** | (2006.01) |
| ***F16D 121/04*** | (2012.01) |
| ***F16D 125/08*** | (2012.01) |
| ***F16H 57/02*** | (2012.01) |

(52) U.S. Cl.

CPC .............. *F16H 2057/02026* (2013.01); *F16H 2057/02052* (2013.01); *F16H 2057/02056* (2013.01)

(56) References Cited

U.S. PATENT DOCUMENTS

| | | | | | |
|---|---|---|---|---|---|
| 4,037,694 | A * | 7/1977 | Keese | F16D 55/40 | 180/370 |
| 4,111,455 | A | 9/1978 | Hickman | | |
| 4,140,198 | A * | 2/1979 | Chamberlain | B60K 17/046 | 180/370 |
| 4,142,615 | A * | 3/1979 | Sidles, Jr. | F16D 55/40 | 180/370 |
| 4,173,269 | A * | 11/1979 | Craig | B60T 1/065 | 188/71.6 |
| 4,207,968 | A * | 6/1980 | Chamberlain | F16D 55/40 | 188/72.3 |
| 4,418,785 | A | 12/1983 | Ehrlinger | | |
| 4,437,530 | A | 3/1984 | De Young | | |
| 4,646,880 | A * | 3/1987 | Logan | F16D 65/853 | 74/489 |
| 5,046,590 | A * | 9/1991 | Trema | F16D 55/224 | 188/26 |
| 5,562,186 | A | 10/1996 | Osenbaugh | | |
| 5,785,218 | A | 7/1998 | LaLone | | |
| 6,073,731 | A | 6/2000 | Ieda | | |
| 6,254,194 | B1 | 7/2001 | Capouellez | | |
| 6,260,668 | B1 | 7/2001 | McClanahan | | |
| 6,416,136 | B1 | 7/2002 | Smith | | |
| 6,681,903 | B2 * | 1/2004 | Tar | B60T 1/062 | 188/73.1 |
| 6,685,275 | B2 | 2/2004 | Gorges | | |
| 6,817,963 | B1 | 11/2004 | Solka | | |
| 7,458,594 | B2 | 12/2008 | Kim | | |
| 7,762,372 | B2 | 7/2010 | LeBlanc, Sr. | | |
| 7,766,353 | B2 | 8/2010 | LeBlanc, Sr. | | |
| 8,499,659 | B2 | 8/2013 | Benson et al. | | |
| 8,771,132 | B2 | 7/2014 | Fujimoto et al. | | |
| 10,889,182 | B1 | 1/2021 | Lee et al. | | |
| 2004/0200660 | A1 | 10/2004 | Szalai | | |
| 2006/0138740 | A1 | 6/2006 | Nam | | |
| 2006/0183592 | A1 | 8/2006 | Kingston | | |
| 2007/0034458 | A1 | 2/2007 | Rogers | | |
| 2007/0145816 | A1 | 6/2007 | Gile | | |
| 2007/0219043 | A1 | 9/2007 | Moon | | |
| 2010/0007198 | A1 * | 1/2010 | Armfield | B60B 35/122 | 301/132 |
| 2012/0181850 | A1 | 7/2012 | Armfield | | |
| 2015/0298502 | A1 | 10/2015 | Ogahara et al. | | |
| 2016/0178022 | A1 | 6/2016 | McGee et al. | | |
| 2017/0120675 | A1 | 5/2017 | Chung | | |
| 2017/0120676 | A1 * | 5/2017 | Chung | B60T 1/065 | |
| 2020/0231037 | A1 | 7/2020 | Stephan et al. | | |
| 2020/0269821 | A1 * | 8/2020 | Stephan | B60T 1/062 | |
| 2021/0122227 | A1 * | 4/2021 | Bindl | B60T 13/12 | |
| 2021/0172495 | A1 | 6/2021 | Mepham | | |
| 2022/0355616 | A1 * | 11/2022 | Krueger | B60B 35/125 | |
| 2023/0113055 | A1 * | 4/2023 | Bittlingmaier | B60T 1/062 | 192/219.4 |
| 2026/0034834 | A1 * | 2/2026 | Rezania | B60B 27/02 | |

FOREIGN PATENT DOCUMENTS

| | | | | | |
|---|---|---|---|---|---|
| CN | 111775902 | A | * | 10/2020 | B60B 35/122 |
| CN | 112223956 | A | * | 1/2021 | B66F 9/07572 |
| CN | 112503116 | A | * | 3/2021 | F16D 65/14 |
| CN | 116061604 | A | * | 5/2023 | B60B 35/14 |
| CN | 109611471 | B | * | 1/2024 | F16D 55/24 |
| CN | 110043583 | B | * | 5/2024 | F16D 65/14 |
| CN | 111765235 | B | * | 8/2024 | F16D 25/123 |
| CN | 221541111 | U | * | 8/2024 | B60B 35/16 |
| DE | 19648979 | B4 | * | 8/2009 | B60K 17/043 |
| DE | 102016204658 | A1 | * | 9/2017 | B60T 1/065 |
| DE | 202019005826 | U1 | * | 5/2022 | F16D 65/853 |
| DE | 112023005972 | T5 | * | 12/2025 | B60T 1/065 |
| GB | 1049140 | | | 11/1966 | |
| GB | 2026962 | A | | 2/1980 | |
| WO | WO-2010041824 | A2 | * | 4/2010 | B60K 17/046 |
| WO | WO-2014002829 | A1 | * | 1/2014 | B60B 27/02 |
| WO | WO-2015197637 | A1 | * | 12/2015 | F16D 55/40 |
| WO | WO-2020098859 | A1 | * | 5/2020 | B60B 3/001 |
| WO | WO-2020119859 | A1 | * | 6/2020 | F16D 55/40 |

* cited by examiner

MODULAR PORTAL BOX WET BRAKE

BACKGROUND

The present disclosure relates to portal boxes.

Portal boxes can be commonly used with all-terrain vehicles (ATV's), utility task vehicles (UTV's), and other vehicles to increase ground clearance. In addition, portal boxes can allow a larger wheel and/or tire to be attached to the vehicle to further increase the ground clearance. Such larger wheels require a greater force to slow the wheels during braking, and an original brake on the vehicle may not be powerful enough to sufficiently slow the larger wheel. In some cases, a supplementary brake is added to the portal box to increase the brake power.

A user can utilize the increased ground clearance from the portal box and larger wheels for activities like off-road driving. For example, the increased clearance can assist the vehicle to travel through various natural conditions, such as mud, rocks, sand, and snow. Such off-road driving can expose the brakes to moisture, dirt, mud, and other substances. In some cases, such substances can damage the brake, decrease the brake's effectiveness, and/or affect the brake in other ways. For example, mud can accumulate in the brake, physically impede part of the brake, contaminate brake fluid, cause the brake to rust, and/or cause other issues.

There is a need for an enclosed wet brake on a portal box. This can be accomplished through a combination of several design features described below.

DESCRIPTION OF THE SELECTED EMBODIMENTS

Figure 1:
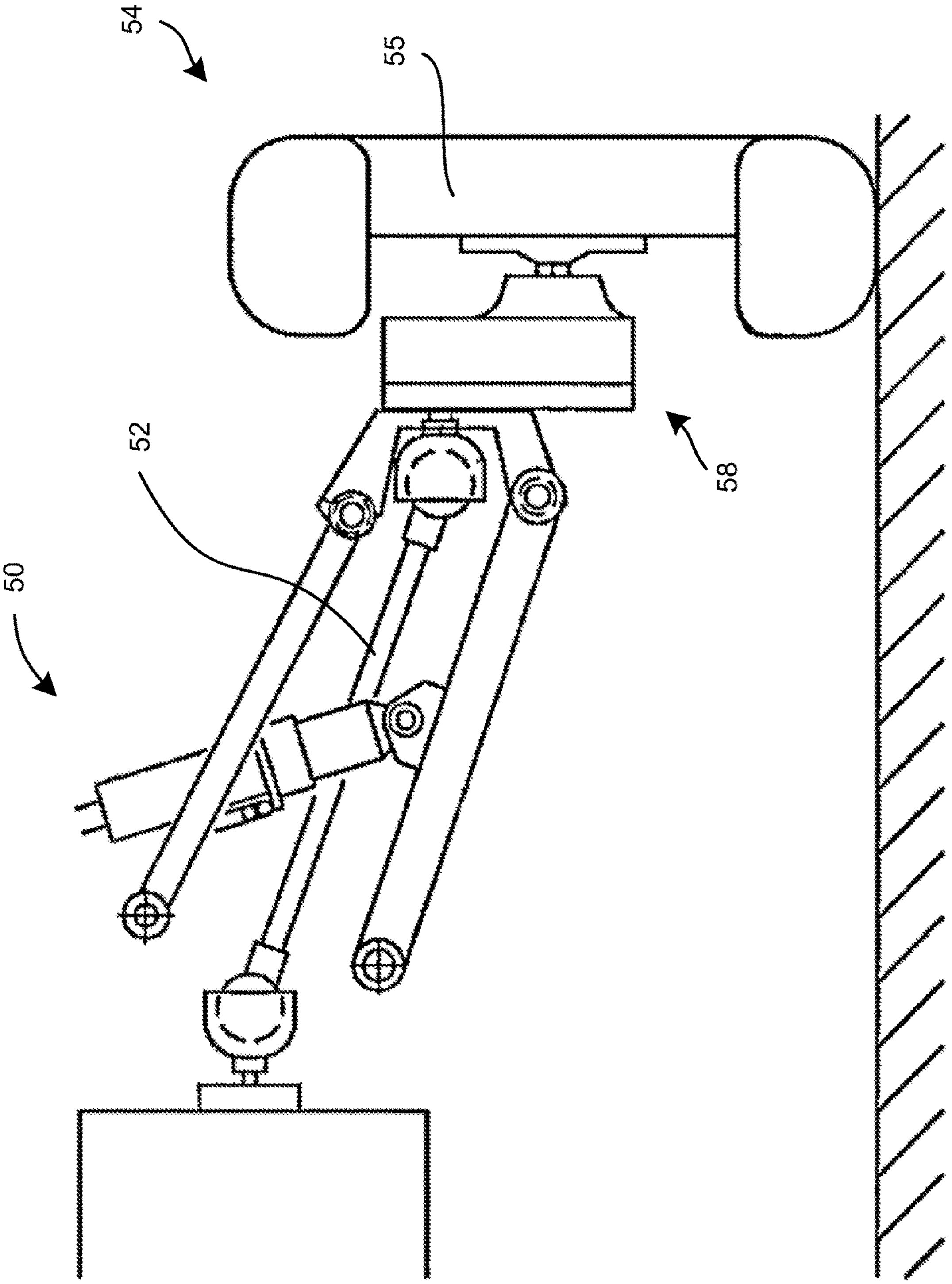
FIG. 1 is a side perspective view of a portal lift assembly attached to a vehicle.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail, although it will be apparent to those skilled in the relevant art that some features that are not relevant to the present claimed invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "left", "right", "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Referring to FIG. 1, a vehicle 50 generally includes an axle 52 and wheels 54. For instance, vehicle 50 can be an all-terrain vehicle (ATV), utility task vehicle (UTV), and/or another type of vehicle. Generally, vehicle 50 is configured apply torque to axle 52 through an engine and/or motor. Axle 52 is mechanically linked to wheel 54 such that power supplied from vehicle 50 to axle 52 is transferred to wheel 54. Wheel 54 includes a wheel rim 55 configured to support a tire on wheel 54. In the illustrated embodiment, a portal lift assembly 58 is installed on vehicle 50. Portal lift assembly 58 is configured to mechanically link axle 52 to wheel 54. When axle 52 and wheel 54 are coupled to portal lift assembly 58, portal lift assembly 58 raises axle 52 above the center of wheel 54. Compared to coupling wheel 54 directly to axle 52, portal lift assembly 58 provides increased ground clearance for vehicle 50.

Figure 3:
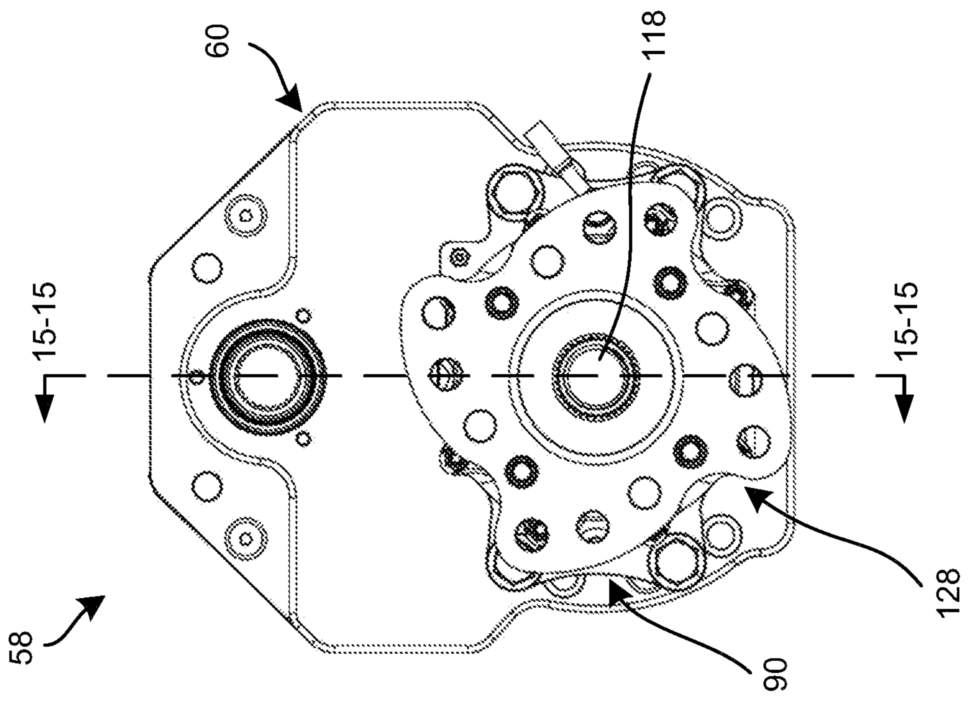
FIG. 3 is a front elevation view of the FIG. 2 portal lift assembly.
Figure 2:
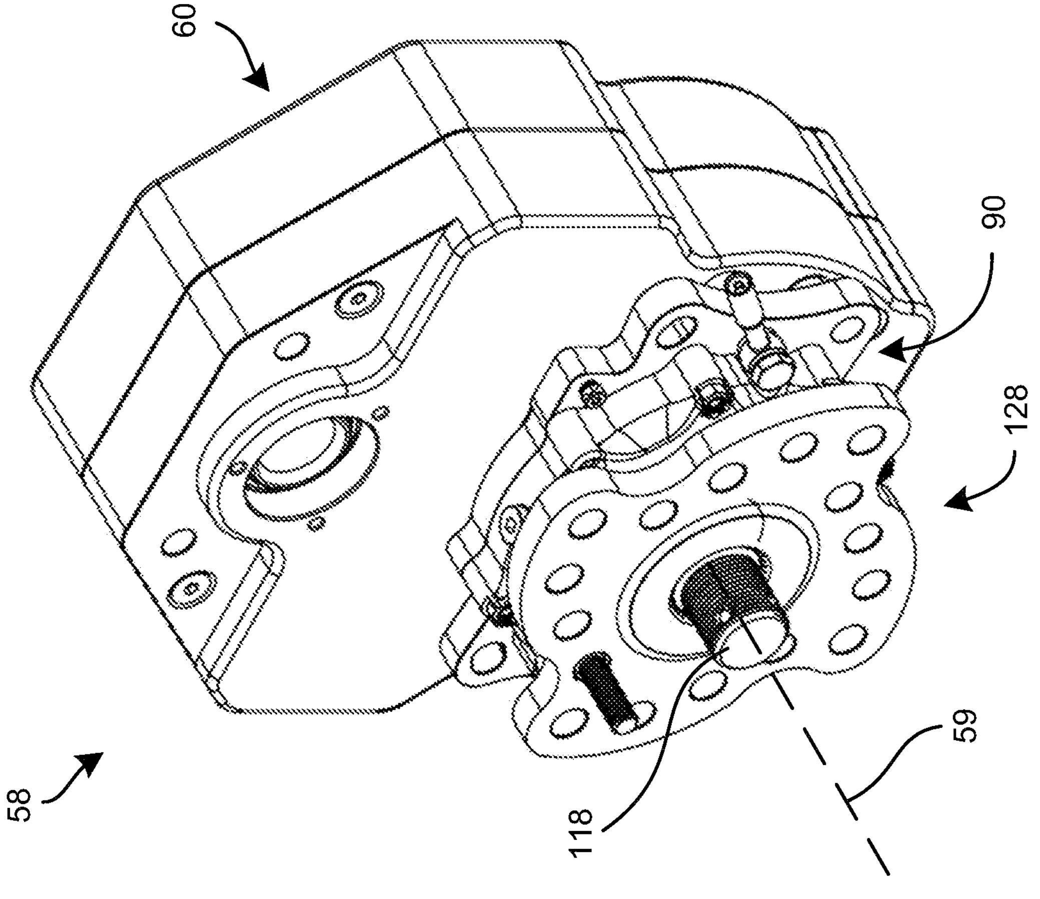
FIG. 2 is a perspective view of a portal lift assembly.
Figure 4:
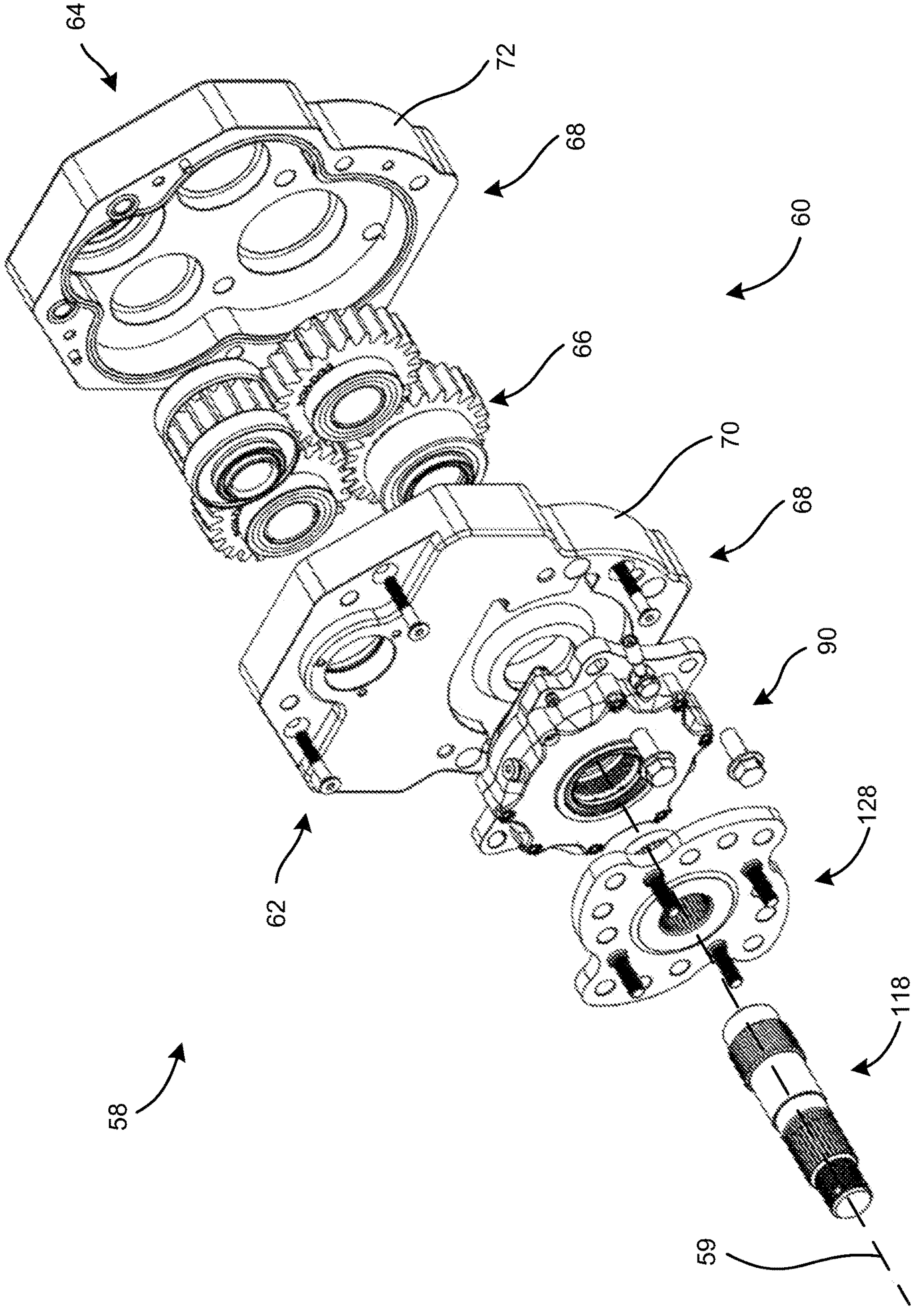
FIG. 4 is an exploded assembly view of the FIG. 2 portal lift assembly.
Figure 17:
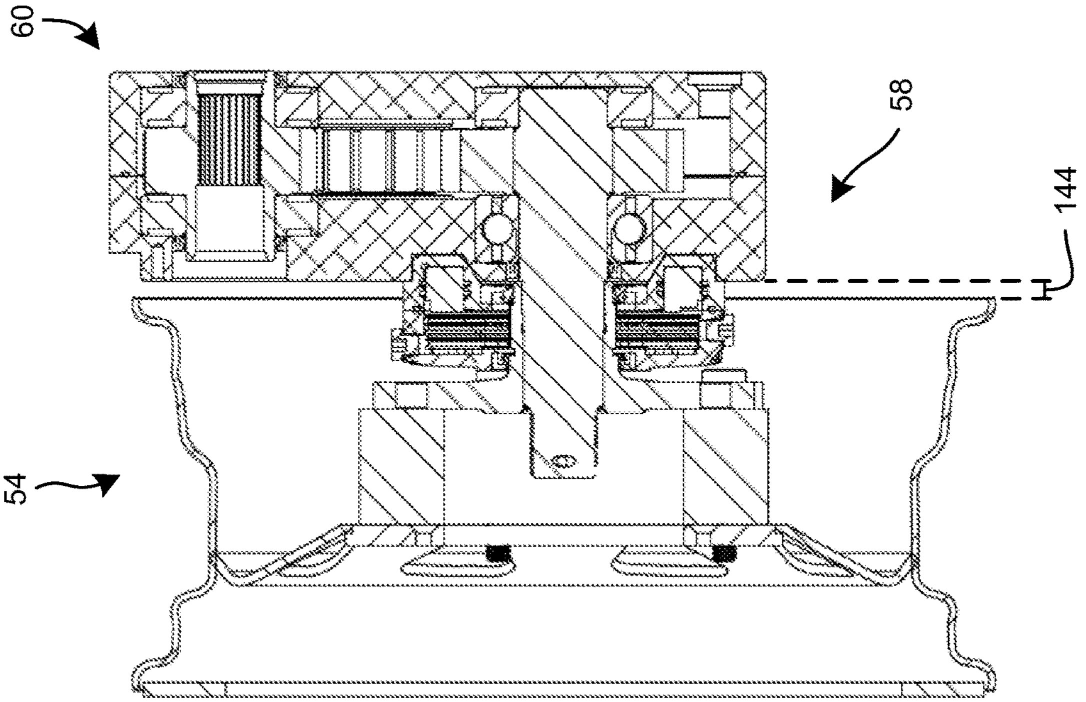
FIG. 17 is a cross-sectional view of the FIG. 16 portal lift assembly and wheel rim taken along line 17-17 in FIG. 16.
Figure 16:
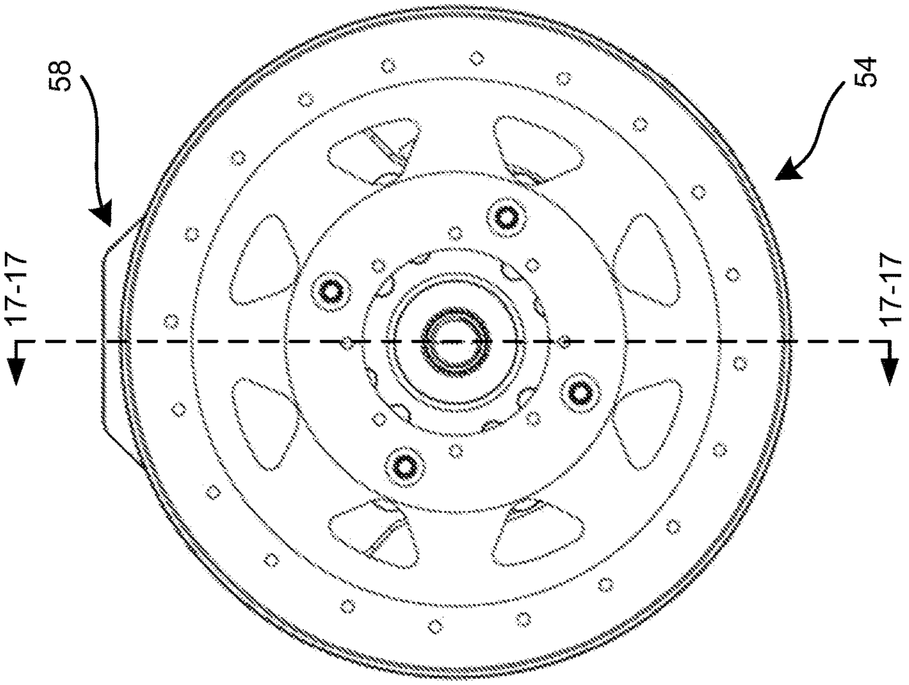
FIG. 16 is a front elevation view of the FIG. 2 portal lift assembly and a wheel rim, a component of the FIG. 1 vehicle.

Referring to FIGS. 2, 3, and 4, portal lift assembly 58 is illustrated. Portal lift assembly 58 includes an output axis 59 positioned away from the axis defined by axle 52. Portal lift assembly 58 is configured to support wheel 54 to rotate about output axis 59. Portal lift assembly 58 generally includes a portal box 60, a brake module 90, an output shaft 118, and a wheel hub 128. Portal box 60 is configured to transfer torque from axle 52 to output shaft 118. Brake module 90 is configured to couple to portal box 60 and is configured to apply a braking force to output shaft 118 and wheel hub 128. Output shaft 118 is aligned with output axis 59 so as to rotate about output axis 59. Wheel hub 128 (as shown in FIGS. 16 and 17) is configured to couple wheel 54 to output shaft 118. In this way, wheel 54, output shaft 118, and wheel hub 128 are configured to fixedly couple to one another so as to rotate together about output axis 59.

FIG. 4 illustrates an exploded assembly view of portal lift assembly 58. As shown, portal box 60 generally includes a gearset 66 and a housing 68. Gearset 66 is configured to mechanically link axle 52 to output shaft 118. In one embodiment, gearset 66 defines a gear ratio greater than 1.4:1 from axle 52 to output shaft 118. In another embodiment, the gear ratio is between 1:1 and 1.4:1. By reducing the rotational speed of output shaft 118 relative to axle 52, gearset 66 allows a user to increase the size of wheel 54 attached vehicle 50. For example, compared to the having a smaller wheel 54 coupled directly to axle 52, gearset 66 enables vehicle 50 to travel at the same speed with a larger wheel 54 using portal box 60. Though gearset 66, the torque and speed of the larger wheel 54 appear the same to an engine, motor, and/or transmission on vehicle 50 comparable to using the smaller wheel 54 coupled directly to axle 52. Thus, a user can control the speed of vehicle 50 in the same way as in an original vehicle 50 and wheel 54 configuration when using portal box 60.

Housing 68 is configured to enclose gearset 66 and provide the structure of portal box 60. As shown, housing 68 includes a front portion 70 positioned towards a front side 62 and a rear portion 72 positioned towards a rear side 64. Front portion 70 and rear portion 72 are configured to fixedly couple to each other to form housing 68. For example, front portion 70 can couple to rear portion 72 through bolts, screws, and/or other types of fasteners. By constructing housing 68 using front portion 70 and rear portion 72, portal box 60 can be assembled and disassembled. In this way, housing 68 is configured to facilitate repairing, replacing parts, cleaning, and/or other maintenance on portal box 60. To provide stability, housing 68 is made from a rigid material, such as a metallic material. In one example, front portion 70 and rear portion 72 can be made of aluminum. Front portion 70 and rear portion 72 can be formed in various ways, such as machining a solid piece of material and/or casting using a mold as examples. As should be appreciated, housing 68 could be constructed using more than two pieces.

Figure 5:
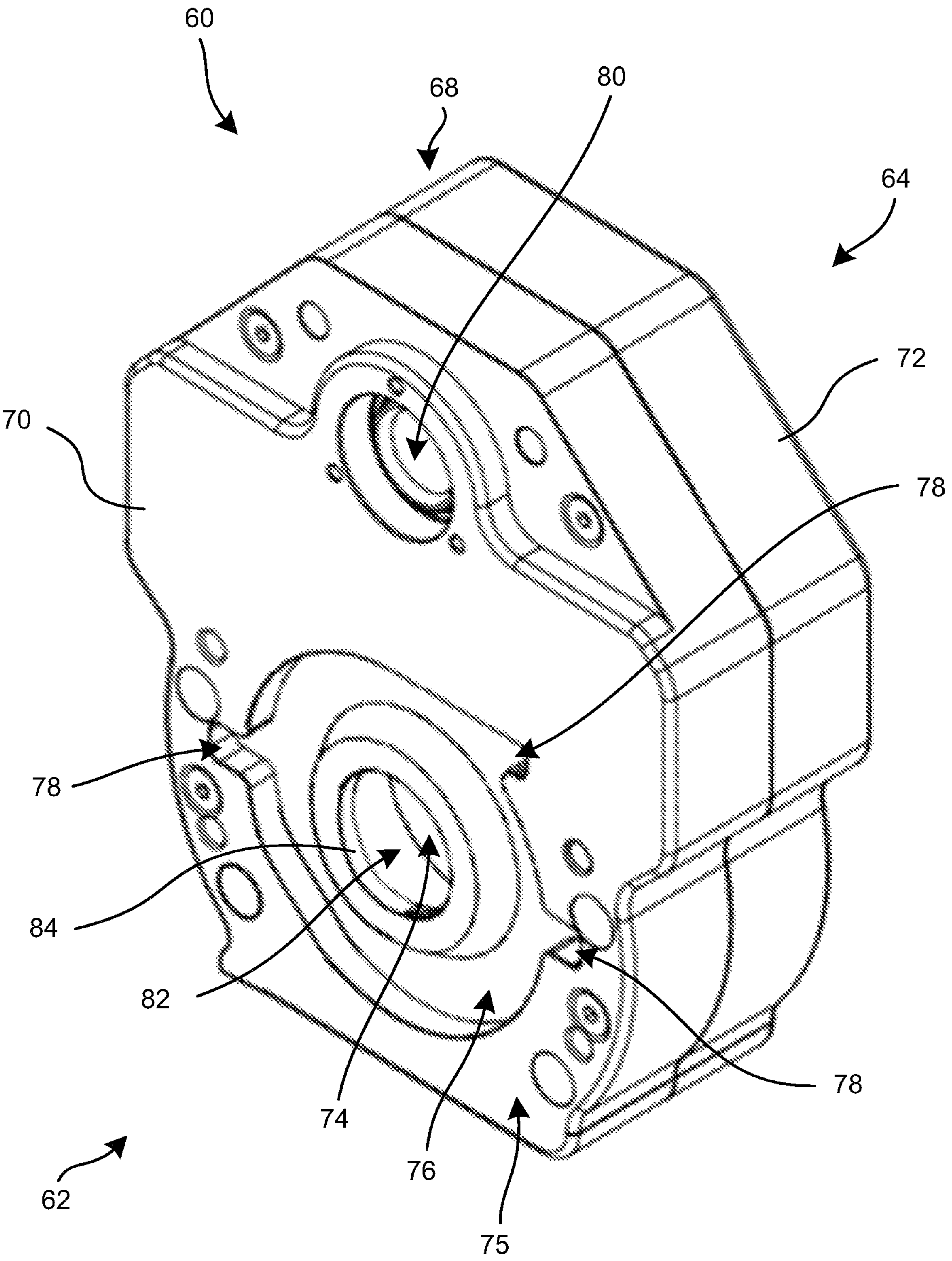
FIG. 5 is a front perspective view of a portal box, a component of the FIG. 2 portal lift assembly.
Figure 7:
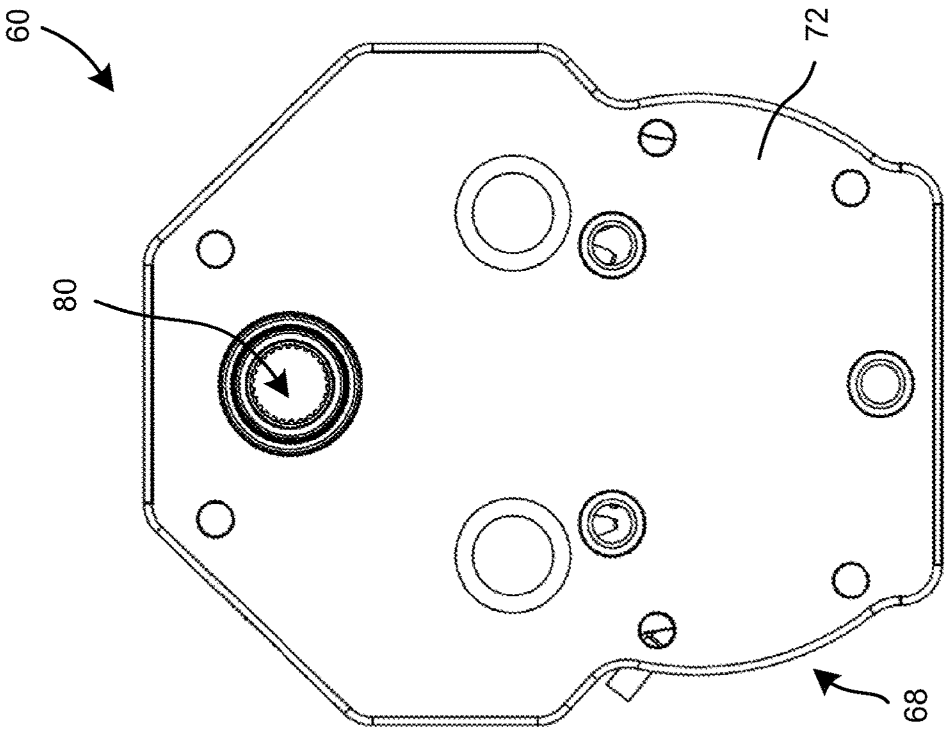
FIG. 7 is a rear elevation view of the FIG. 5 portal box.
Figure 6:
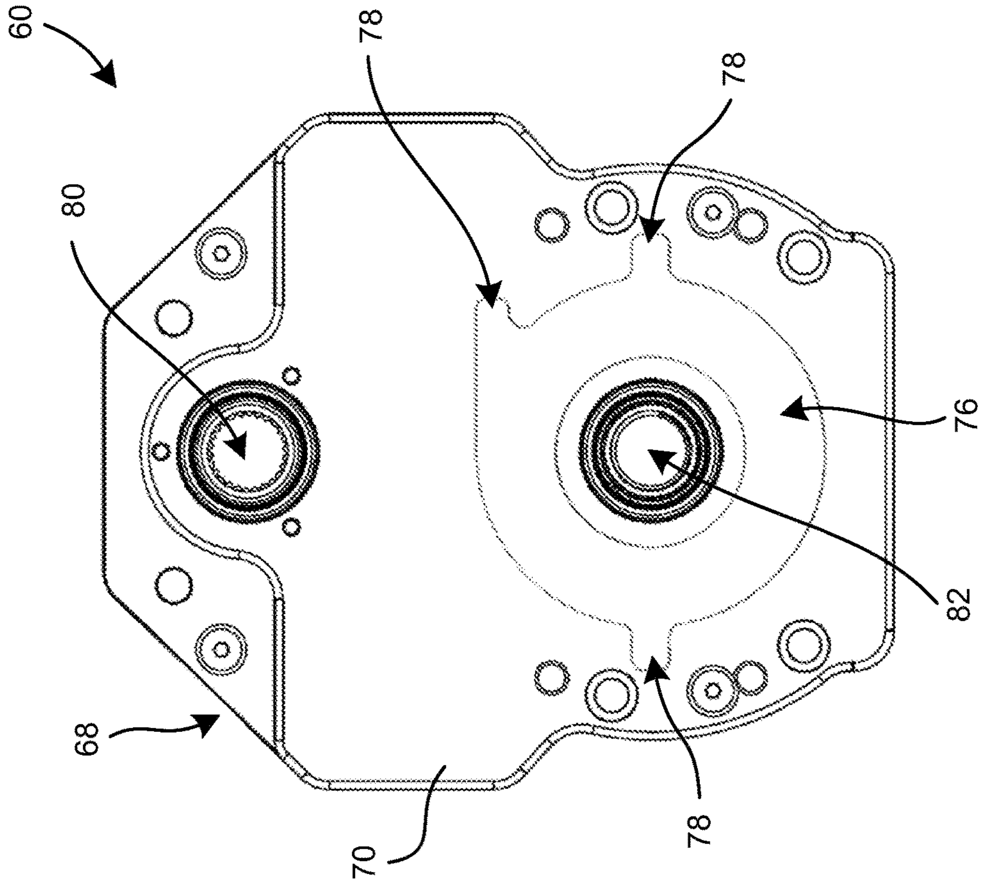
FIG. 6 is a front elevation view of the FIG. 5 portal box.

Referring to FIGS. 5, 6 and 7, portal box 60 is illustrated. Portal box 60 defines a front edge 75 on front portion 70. Front portion 70 defines front edge 75 as a continuous and smooth surface at the furthest points toward front side 62. In the illustrated embodiment, front edge 75 defines a plane that extends along front portion 70 on front side 62. The flat, uniform area of front portion 70 forms the plane of front edge 75 that extends across all of front portion 70 on front side 62. Portal box 60 additionally defines a recess 76 that is configured to receive brake module 90. Recess 76 extends towards rear side 64 relative to front edge 75. Recess 76 allows brake module 90 to extend towards the interior of portal box 60 beyond front edge 75 so as to allow brake module 90 to be positioned closer to the interior of portal box 60. In one example, recess 76 allows an interior portion of brake module 90 to extend through front edge 75 toward rear side 64. Note that while front edge 75 is defined in terms of a planer surface, front edge 75 does not have to be planer.

Using a traditional portal lift assembly, wheel 54 is positioned away from a portal box to provide space for a brake. However, using portal box 60, brake module 90 can be positioned partially within recess 76 so as to allow wheel 54 to be positioned closely against portal box 60 and/or to allow for the use of a thicker brake module 90. In this way, recess 76 allows the longitudinal length of portal lift assembly 58 to be reduced compared to a traditional lift assembly. For example, when installed on vehicle 50, portal lift assembly 58 can support a reduced wheel-to-wheel width of vehicle 50 and wheels 54 compared to a traditional lift assembly.

In the illustrated embodiment, front portion 70 defines recess 76, and portal box 60 is configured to couple to brake module 90 on front side 62. Recess 76 is generally shaped to compliment the shape of brake module 90. In the illustrated example, recess 76 mirrors the shape of brake module 90 and is irregular. In another example, recess 76 can be rectangular, triangular, or another shape.

Portal box 60 further defines sockets 78 that extend from recess 76. Sockets 78 are configured to receive a portion of brake module 90. In combination with recess 76, sockets 78 form a non-circular shape such as to inhibit or completely prevent rotation of brake module 90 about output axis 59 when brake module 90 is positioned in recess 76. By inhibiting rotation of brake module 90, sockets 78 enforce the coupling between portal box 60 and brake module 90 and support overall structural stability for portal lift assembly 58. In the illustrated example, sockets 78 are oriented so as to resist the braking force from brake module 90. Using this arrangement, sockets 78 fix brake module 90 relative to portal box 60 and prevent brake module 90 from rotating with output shaft 118 when brake module 90 applies braking force to output shaft 118 and wheel hub 128. By resisting rotation of brake module 90 in the same direction as output shaft 118, sockets 78 support reliable operation of brake module 90.

In the illustrated embodiment, sockets 78 are spaced around a circumference of recess 76. For example, two sockets 78 are positioned directly opposite each other, and one socket 78 is positioned between. Such spacing of sockets 78 distributes force around a circumference of brake module 90 to rotationally fix brake module 90 relative to portal box 60. Portal box 60 can utilize various numbers, shapes, and/or positions of sockets 78. For instance, sockets 78 can be uniformly spaced around a circumference of recess 76. In an alternative example, portal box 60 can define a single socket 78 extending from recess 76. In yet another example, portal box 60 can define recess 76 but not sockets 78 such that recess 76, and not socket 78, is configured to resist rotation of brake module 90. As should be appreciated, portal box 60 can define a different overall shape of recess 76 and sockets 78 so as to fix the rotation of brake module 90 about output axis 59 relative to portal box 60.

As shown in FIGS. 5, 6, and 7, housing 68 defines an axle opening 80 that extends through both front portion 70 and rear portion 72. In the illustrated embodiment, axle opening 80 extends from front side 62 to rear side 64. For example, axle 52 can be inserted into axle opening 80 from rear side 64. In an alternate embodiment, axle opening 80 may extend only through rear portion 72. Axle opening 80 is aligned with an input gear of gearset 66 so as to allow axle 52 to pass through axle opening 80 and mechanically couple to the input gear. Below axle opening 80, portal box 60 defines an output opening 82 that is configured to receive output shaft 118. Axle opening 80 extends through front portion 70 towards front side 62. Output opening 82 is aligned with an output gear of gearset 66 so as to allow output shaft 118 to pass through output opening 82 and mechanically couple to the output gear.

Housing 68 defines an interior volume 74 between front portion 70 and rear portion 72. Gearset 66 is positioned within interior volume 74. In addition to gearset 66, interior volume 74 is configured to contain fluid, such as oil. For example, portal box 60 can retain a transmission fluid to lubricate and/or cool gearset 66. Such transmission fluid can improve the durability, reliability, and/or efficiency of portal box 60.

Portal box 60 further includes a gasket 84 that is positioned within output opening 82. Gasket 84 is configured to seal output opening 82 against output shaft 118 when output shaft 118 is positioned within output opening 82. In this way, gasket 84 is configured to limit or fully prevent material and fluids from entering and/or exiting output opening 82. Further, gasket 84 supports housing 68 to retain fluid within interior volume 74. Using housing 68 and gasket 84, portal box 60 can contain fluid without the fluid leaking out of output opening 82. Housing 68, gasket 84, output shaft 118 additionally limit or fully prevent outside substances from entering interior volume 74. For example, output opening 82 can be sealed so as to protect interior volume 74 from mud, moisture, dust, gravel, and/or other materials that vehicle 50 may encounter in an off-road environment.

Figure 8:
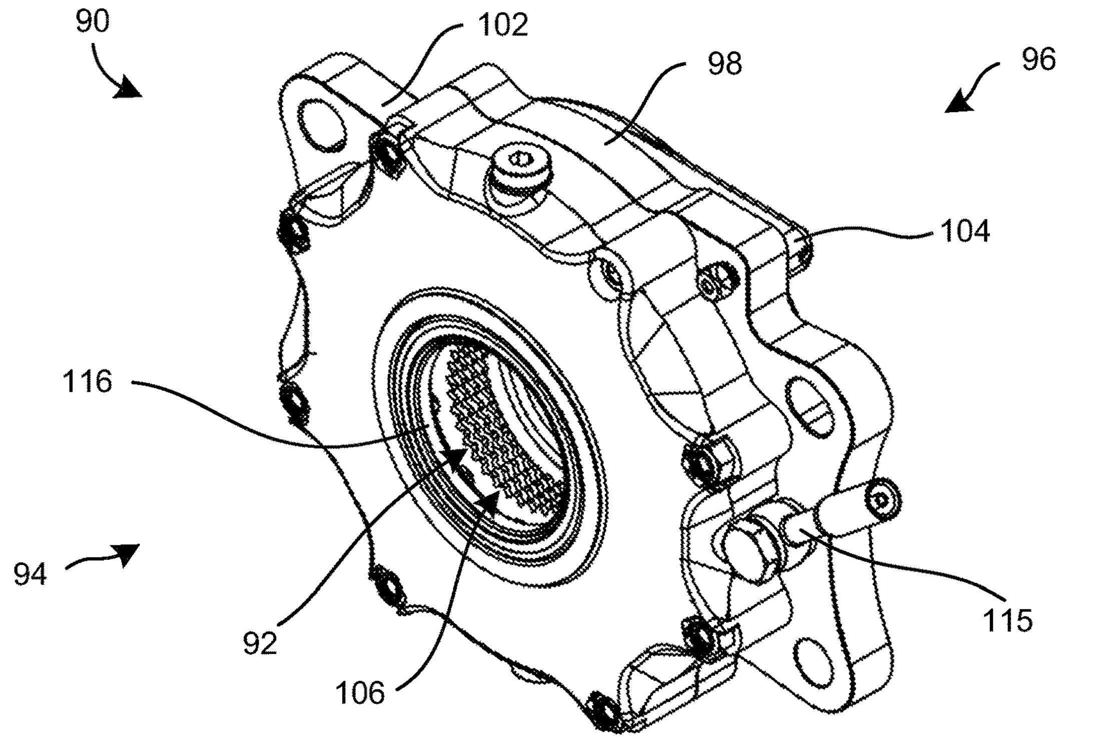
FIG. 8 is a front perspective view of a brake module, a component of the FIG. 2 portal lift assembly.
Figure 9:
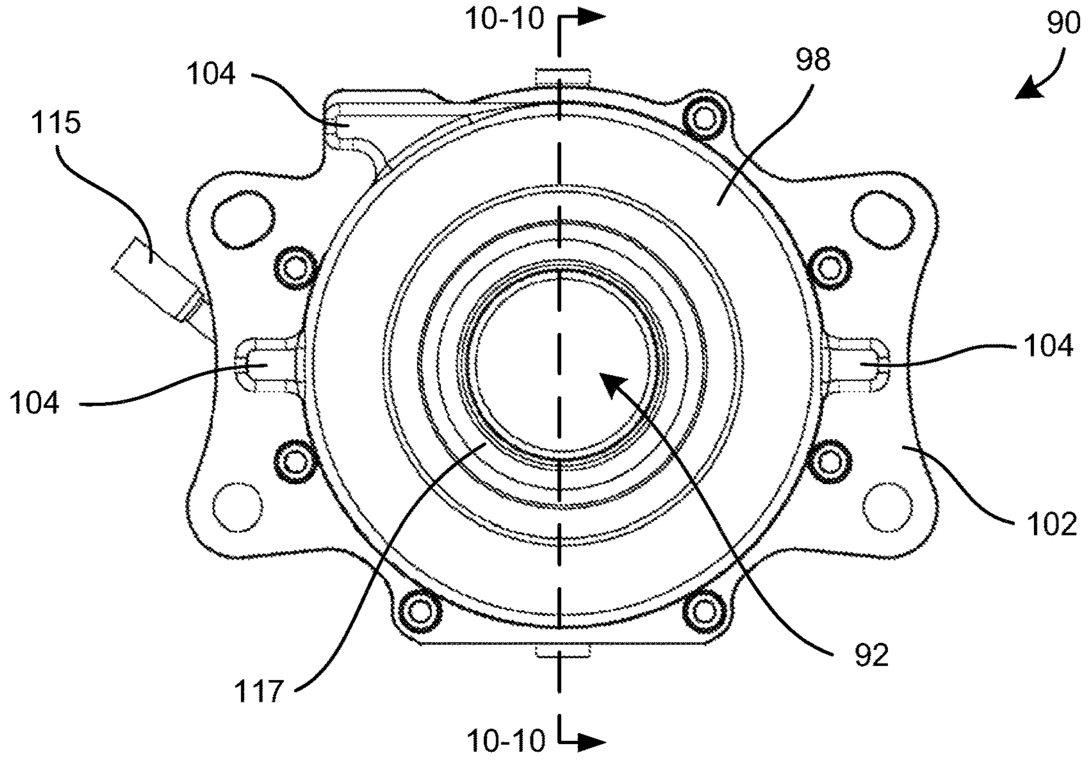
FIG. 9 is a rear elevation view of the FIG. 8 brake module.
Figure 10:
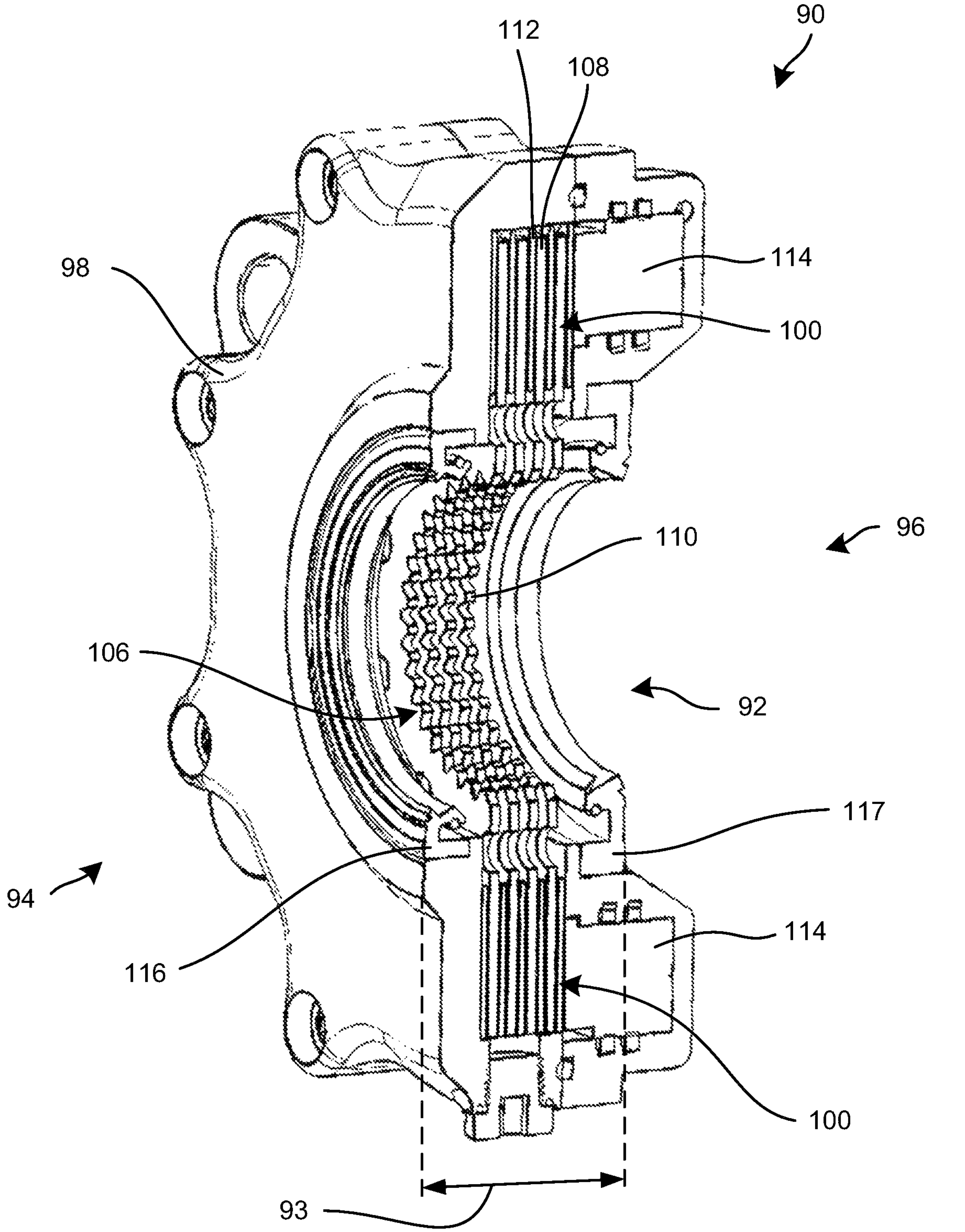
FIG. 10 is a cross-sectional perspective view of the FIG. 8 brake module taken along line 10-10 in FIG. 9.

FIGS. 8, 9, and 10 illustrate brake module 90. Brake module 90 is detachable from portal lift assembly 58. Using a detachable brake module 90, a user can service brake module 90 without having to disassemble or otherwise disturb portal box 60. For instance, a user can detach brake module 90 from portal box 60 while maintaining the seal on output opening 82 of portal box 60 and vis versa.

As shown, brake module 90 defines a central opening 92 that extends from a wheel side 94 to a box side 96. Central opening 92 is configured to receive wheel hub 128. In portal lift assembly 58, wheel hub 128 is positioned on wheel side 94 of brake module 90. Opposite wheel hub 128, portal box 60 is positioned on box side 96 of brake module 90 and is configured to couple to brake module 90 on box side 96.

Brake module 90 includes a housing 98. Housing 98 provides structure for brake module 90 and encloses the internal components of brake module 90. Housing 98 is made of a rigid material, such as a metallic material. For instance, housing 98 can be made of aluminum. In one example, housing 98 of brake module 90 can be made of the same material as housing 68 of portal box 60. Further, housing 98 can be formed in various ways, such as machining a solid piece of material and/or casting using a mold as examples. In the illustrated example, housing 98 is constructed from two parts. Similar to housing 68 of portal box 60, the two-part construction can facilitate repairing, replacing parts, cleaning, and/or other maintenance for brake module 90. As should be appreciated, housing 98 could be formed using a different number of parts.

As illustrated, housing 98 is generally annular in shape. The annular shape of housing 98 compliments the shape of recess 76 on portal box 60, as shown in FIGS. 5 and 6. Housing 98 is generally shaped to allow recess 76 to receive brake module 90. As should be appreciated, housing 98 and recess 76 can be formed as another shape. For example, housing 98 and recess 76 can be irregular and/or non-circular in shape such as to enforce the coupling and further prevent rotational movement between brake module 90 and portal box 60.

Housing 98 includes a flange 102 that extends from brake module 90. Flange 102 provides an area for fasteners to couple brake module 90 to portal box 60. For example, flange 102 can support coupling to portal box 60 using one or more screws and/or bolts. In one example, flange 102 can be positioned in recess 76 on portal box 60 when brake module 90 is coupled to portal box 60. For example, recess 76 can be shaped to receive a portion of brake module 90 that includes flange 102.

On box side 96, housing 98 further includes tabs 104. Tabs 104 are configured to be positioned in sockets 78 on portal box 60. The overall shape of housing 98 including tabs 104 is configured to mirror the overall shape of recess 76 and sockets 78, as shown in FIGS. 5 and 6. When tabs 104 are positioned within sockets 78, brake module 90 is inhibited or fully prevented from rotating relative to portal box 60. In this way, tabs 104 are configured to enforce the strength and stability of portal lift assembly 58, particularly when brake module 90 applies a braking force to wheel hub 128. Tabs 104 are generally shaped and positioned to compliment the shape and position of sockets 78. As should be appreciated, tabs 104 and sockets 78 could be shaped and/or arranged in other ways. In one embodiment, tabs 104 are integrally formed with housing 98. In an alternate embodiment, tabs 104 can be separate parts that are fastened and/or coupled in another way to housing 98.

On the interior, brake module 90 includes a clutch pack 106 and pistons 114. Pistons 114 are operable to engage clutch pack 106 such as to apply a braking force to output shaft 118 in portal lift assembly 58. For example, a user can selectively actuate pistons 114 by pressurizing or depressurizing a space with hydraulic fluid. As shown in FIGS. 8 and 9, brake module 90 includes a banjo 115 on an external portion. Banjo 115 is coupled to housing 98 and provides a passage for hydraulic fluid to travel into and out of brake module 90. Banjo 115 is configured to couple to a hydraulic line so as to allow a user to operate pistons 114 using hydraulic fluid. As should be appreciated, pistons 114 could be operated in a different way, such as through a mechanical and/or electrical actuator.

Clutch pack 106 includes a first set of plates 108 and a second set of plates 112. First set of plates 108 and second set of plates 112 are generally annular in shape and are oriented around output axis 59. Clutch pack 106 is organized such that first set of plates 108 and second set of plates 112 are interspersed from wheel side 94 to box side 96. First set of plates 108 includes teeth 110 on an interior portion. Teeth 110 are configured to cooperate with splines on wheel hub 128 so as to couple first set of plates 108 and wheel hub 128 in rotation. Conversely, second set of plates 112 are splined to housing 98. When pistons 114 engage clutch pack 106, pistons 114 apply a force against first set of plates 108 and second set of plates 112 so as to provide friction between first set of plates 108 and second set of plates 112. Pistons 114 allow brake module 90 to slow or fully stop rotation of first set of plates 108 relative to second set of plates 112 and housing 98.

In the illustrated embodiment, brake module 90 is a wet brake. As illustrated, housing 98 defines an interior volume 100. Housing 98 is configured to contain a fluid within interior volume 100, and clutch pack 106 is positioned in interior volume 100. For example, housing 98 can enclose oil that lubricates and/or cools clutch pack 106. Enclosing the brake in brake module 90 can improve the durability and reliability of brake module 90 in comparison to using a disc brake. Further, housing 98 is configured to separate interior volume 100 from portal box 60. By isolating interior volume 100, brake module 90 can contain a type of oil and/or other fluid that is separate from fluids inside portal box 60. For example, brake module 90 can contain a brake fluid that is separate from a transmission fluid in portal box 60. Housing 98 is further configured to limit and/or fully prevent external substances from entering interior volume 100. For example, housing 98 can prevent external substances from mixing with a brake fluid, prevent mud or dirt from obstructing parts of the brake, protect against rust caused by exposure to moisture, and/or prevent other issues in brake module 90. By partitioning interior volume 100 from other spaces in portal lift assembly 58, brake module 90 is configured to operate reliably and effectively. Further, partitioning interior volume 100 can facilitate performing maintenance on brake module 90, such as changing fluid, cleaning, and/or replacing parts.

Brake module 90 further includes a wheel-side gasket 116 and a box-side gasket 117. Wheel-side gasket 116 is positioned on wheel side 94 along central opening 92. Box-side gasket 117 is positioned on box side 96 along central opening 92. Both wheel-side gasket 116 and box-side gasket 117 are configured to seal central opening 92 when wheel hub 128 is positioned within central opening 92. In combination with housing 98, gaskets 116 and 117 support brake module 90 to retain a brake fluid and to enclose interior volume 100. In combination with housing 98 and wheel hub 128, gaskets 116 and 117 are configured to limit and/or fully prevent substances from an external source and/or portal box 60 from entering interior volume 100 of brake module 90. For example, central opening 92 can be sealed so as to protect interior volume 100 from mud, moisture, dust, gravel, and/or other materials that vehicle 50 may encounter in an off-road environment.

Brake module 90 defines brake length 93 from wheel side 94 to a portion of brake module 90 that contacts front edge 75 when coupled to portal box 60. Brake length 93 is generally the distance that brake module 90 extends from front edge 75 of portal box 60 in portal lift assembly 58. Because brake module 90 is positioned in recess 76 when coupled to portal box 60, a portion of brake module 90 extends outside of brake length 93. For example, one or more internal components of brake module 90 can extend outside of brake length 93, such as pistons 114 and/or another component. When brake module 90 is coupled to portal box 60, such portions of brake module 90 outside of brake length 93 can be positioned beyond front edge 75 toward rear side 64 of portal box 60. In one example, brake length 93 is the minimum length needed for clutch pack 106 and the portion of housing 98 on either side of clutch pack 106. In another example, brake module 90 defines brake length 93 from wheel-side gasket 116 to box-side gasket 117.

Figure 11:
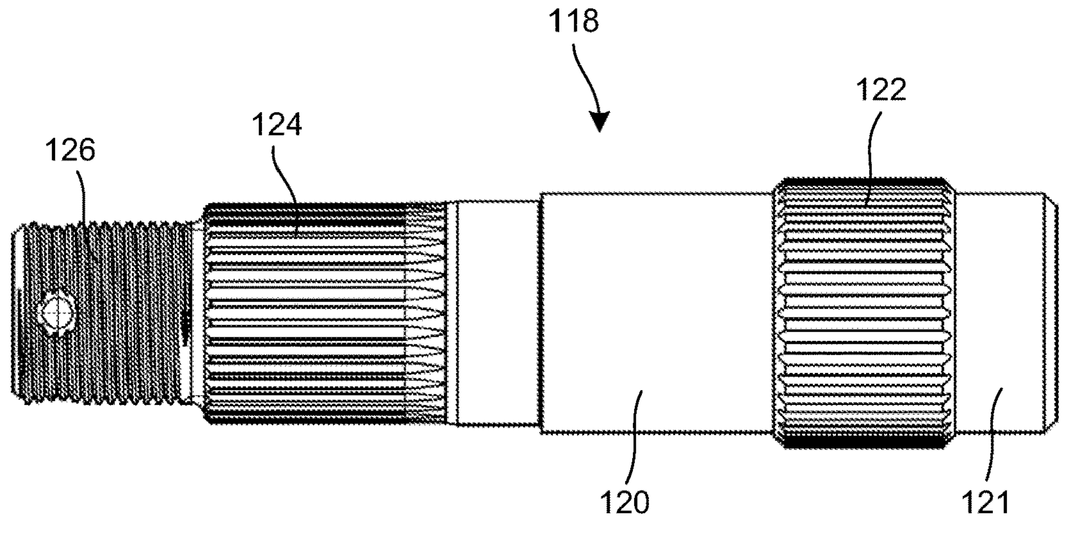
FIG. 11 is a side elevation view of an output shaft, a component of the FIG. 2 portal lift assembly.

FIG. 11 illustrates output shaft 118. Output shaft 118 is configured to rotate about an output axis 59. Output shaft 118 includes smooth portion 120 and 121, a first splined portion 122, a second splined portion 124, and a threaded portion 126. Smooth portions 120 and 121 define generally uniform exterior surfaces and define circular cross-sections on a plane perpendicular to output axis 59. The circular cross-sections and uniform surfaces of smooth portions 120 and 121 support output shaft 118 to rotate consistently and evenly about output axis 59. In portal lift assembly 58, smooth portion 120 is positioned within output opening 82 of portal box 60. In one embodiment, smooth portion 120 is shaped to contact the edge of output opening 82 and/or gasket 84 so as to seal output opening 82. By sealing output opening 82, smooth portion 120 of output shaft 118 enables portal box 60 to fully enclose interior volume 74.

First splined portion 122 is positioned next to smooth portion 120. In the illustrated embodiment, first splined portion 122 is positioned between smooth portions 120 and 121. In portal lift assembly 58, first splined portion 122 of output shaft 118 is positioned within portal box 60 and is configured to couple to gearset 66. As shown, first splined portion 122 includes splines that extend around a circumference of output shaft 118. When output shaft 118 is inserted in portal box 60, first splined portion 122 cooperates with gearset 66. For example, first splined portion 122 can mechanically fix output shaft 118 to an output gear of gearset 66 such that output shaft 118 and the gear rotate about output axis 59 together.

Second splined portion 124 is positioned near smooth portion 120 across from first splined portion 122. Second splined portion 124 includes splines that extend around a circumference of output shaft 118. When output shaft 118 is inserted into wheel hub 128, second splined portion 124 interfaces with wheel hub 128 such that output shaft 118 and wheel hub 128 are rotationally coupled together and rotate about output axis 59 together. In one example, second splined portion 124 can extend a distance along output axis 59 that is greater than brake length 93. Because output shaft 118 is configured to couple to first set of plates 108 of brake module 90 through wheel hub 128, second splined portion 124 can extend fully through brake module 90, and brake module 90 can maintain a seal around central opening 92. Specifically, second splined portion 124 can extend along output axis 59 at the same positions where wheel hub 128 seals central opening 92 of brake module 90. For example, second splined portion 124 can extend along output axis 59 at the same positions as wheel-side gasket 116 and/or box-side gasket 117 in portal lift assembly 58.

Threaded portion 126 is positioned on the distal end of output shaft 118. In one embodiment, threaded portion 126 can receive a nut. For example, a nut can screw onto threads of threaded portion 126. Coupling a nut to threaded portion 126 can limit movement between output shaft 118 and wheel hub 128 along output axis 59. Threaded portion 126 can optionally define a hole to accommodate a pin to hold the nut in place along the threads. As should be appreciated, threaded portion 126 could screw into another part, such as a portion of wheel 54.

Figure 12:
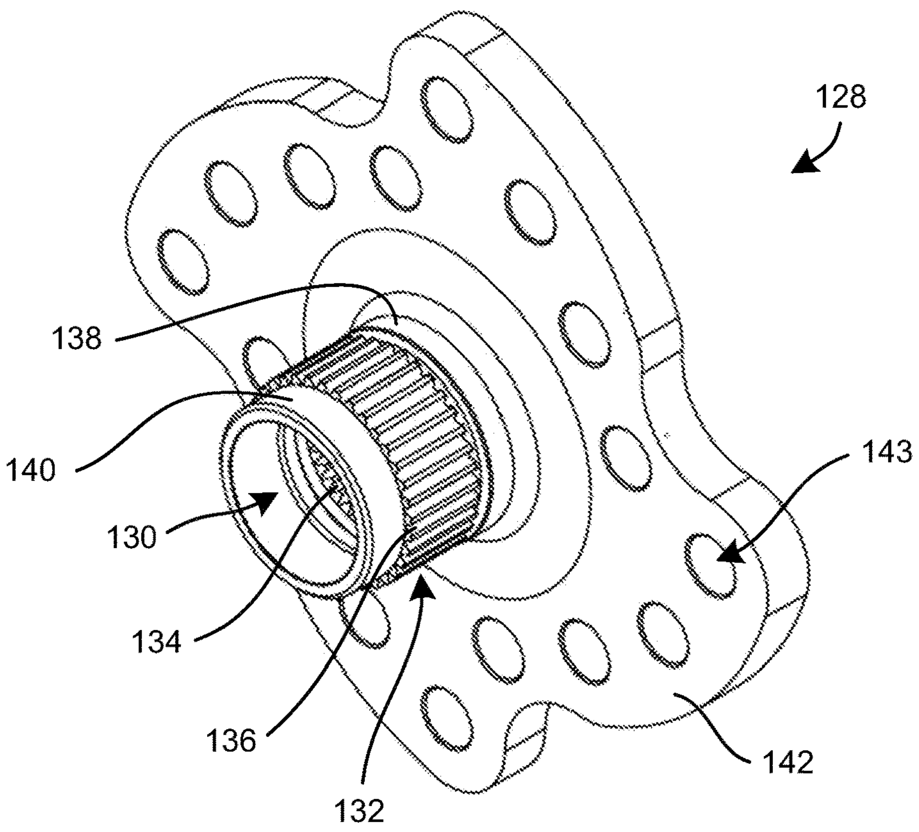
FIG. 12 is front perspective view of a wheel hub, a component of the FIG. 2 portal lift assembly.
Figure 14:
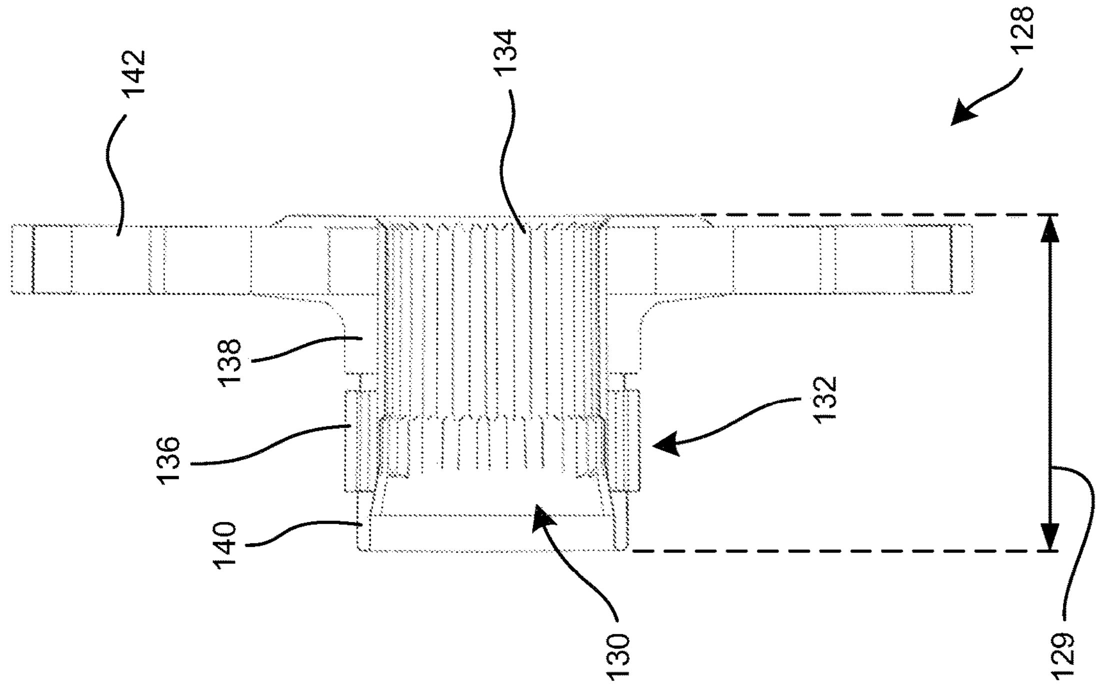
FIG. 14 is a side cross-sectional view of the FIG. 12 wheel hub taken along line 14-14 in FIG. 13.
Figure 13:
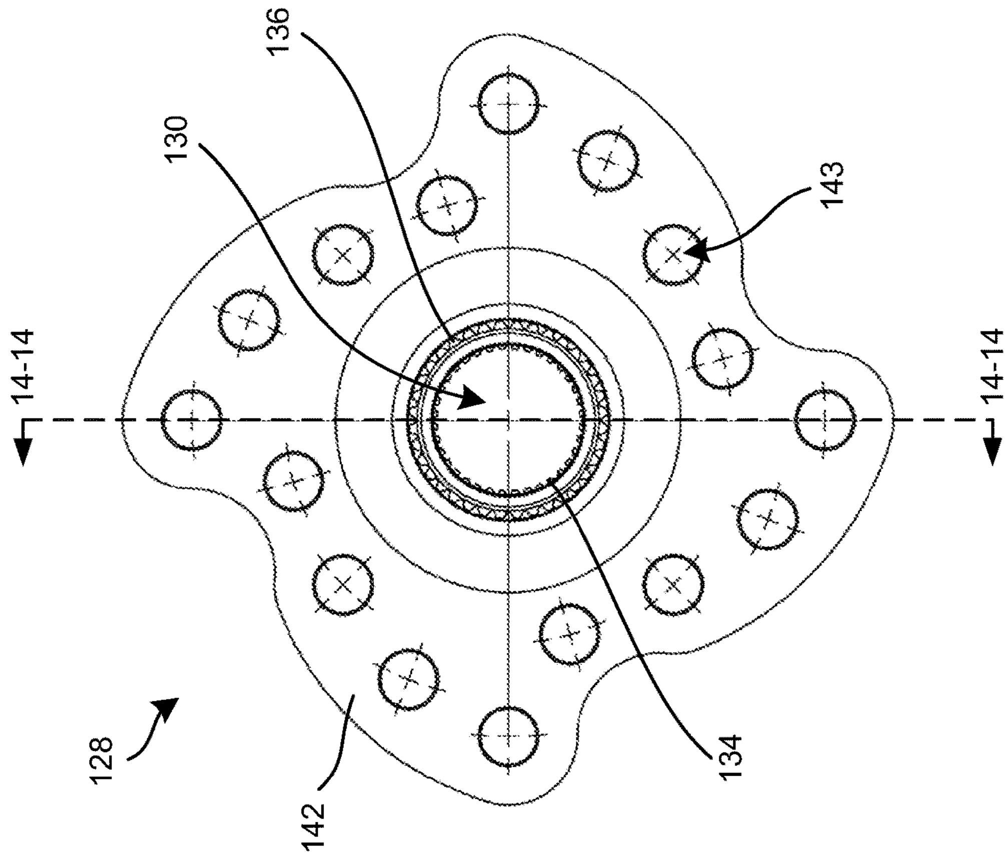
FIG. 13 is a rear elevation view of the FIG. 12 wheel hub.

Referring to FIGS. 12, 13, and 14, wheel hub 128 is illustrated. Wheel hub 128 defines a shaft opening 130 configured to receive output shaft 118. Wheel hub 128 includes a splined portion 132 that defines a portion of shaft opening 130. Splined portion 132 includes inner splines 134 and outer splines 136. Inner splines 134 are configured to cooperate with second splined portion 124 of output shaft 118. When output shaft 118 is inserted into shaft opening 130 of wheel hub 128, inner splines 134 and second splined portion 124 mechanically couple such that output shaft 118 and wheel hub 128 rotate together. Outer splines 136 are configured to cooperate with teeth 110 on first set of plates 108 in brake module 90. When wheel hub 128 is inserted into central opening 92 of brake module 90, outer splines 136 and teeth 110 mechanically couple such that wheel hub 128 and first set of plates 108 rotate together. Brake module 90 is configured to apply braking force to output shaft 118 through wheel hub 128. As should be appreciated, output shaft 118 and wheel hub 128 could alternatively be arranged such that one or more portions of output shaft 118 and/or wheel hub 128 cooperate with teeth 110 in brake module 90. As should also be appreciated, while wheel hub 128 is disclosed as a monolithic piece, wheel hub 128 can be formed from a plurality of difference piece. For example, one piece could interface with the splines on the output shaft and form the sealing surfaces of the brake module while a second piece defines the flange for the wheel.

Wheel hub 128 further includes a first smooth portion 138 and a second smooth portion 140 on either side of outer splines 136. In portal lift assembly 58, first smooth portion 138 is positioned toward wheel 54, and second smooth portion 140 is positioned toward portal box 60. Both smooth portions 138 and 140 define a generally uniform exterior surface and define circular cross-sections on a plane perpendicular to output axis 59. The circular cross-sections and uniform surfaces of smooth portions 138 and 140 support wheel hub 128 to rotate consistently and evenly about output axis 59. First smooth portion 138 is shaped to contact the edge of housing 98 around central opening 92 and/or wheel-side gasket 116 so as to seal central opening 92 on wheel side 94. Similarly, second smooth portion 140 is shaped to contact the edge of housing 98 around central opening 92 and/or box-side gasket 117 so as to seal central opening 92 on box side 96. By sealing central opening 92, first smooth portion 138 and second smooth portion 140 of wheel hub 128 enable brake module 90 to fully enclose interior volume 100. As should be appreciated, output shaft 118 and wheel hub 128 could be arranged such that one or more portions of output shaft 118 and/or wheel hub 128 interact with gaskets 116 and 117 to seal brake module 90.

As shown in FIG. 14, wheel hub 128 defines a hub length 129. Hub length 129 is generally oriented along output axis 59. As illustrated, inner splines 134 extend down a majority of hub length 129. Inner splines 134 extend on both sides of first smooth portion 138 along hub length 129. In another example, inner splines 134 can extend across both first smooth portion 138 and second smooth portion 140. Using this arrangement of inner splines 134, second splined portion 124 of output shaft 118 can extend through central opening 92 on brake module 90 in portal lift assembly 58. First and second smooth portions 138 and 140 of wheel hub 128 can seal central opening 92 of brake module 90 while second splined portion 124 of output shaft 118 is positioned in shaft opening 130 of wheel hub 128. Typically, a splined portion of a shaft cannot be positioned in a sealed opening. However, using wheel hub 128 to seal central opening 92, second splined portion 124 of output shaft 118 can be positioned through central opening 92. Output shaft 118 can couple to first set of plates 108 in brake module 90 through wheel hub 128 while wheel hub 128 seals central opening 92.

Wheel hub 128 includes a flange 142. Flange 142 extends outwards from the rest of wheel hub 128 and provides an area to couple wheel 54 to wheel hub 128. Flange 142 defines fastener openings 143 that are arranged in a symmetrical pattern around flange 142. Fastener openings 143 can be arranged to coincide with openings on wheel 54. Fastener openings 143 are configured to receive bolts, screws, and/or other fasteners so as to couple wheel 54 to wheel hub 128.

Figure 15:
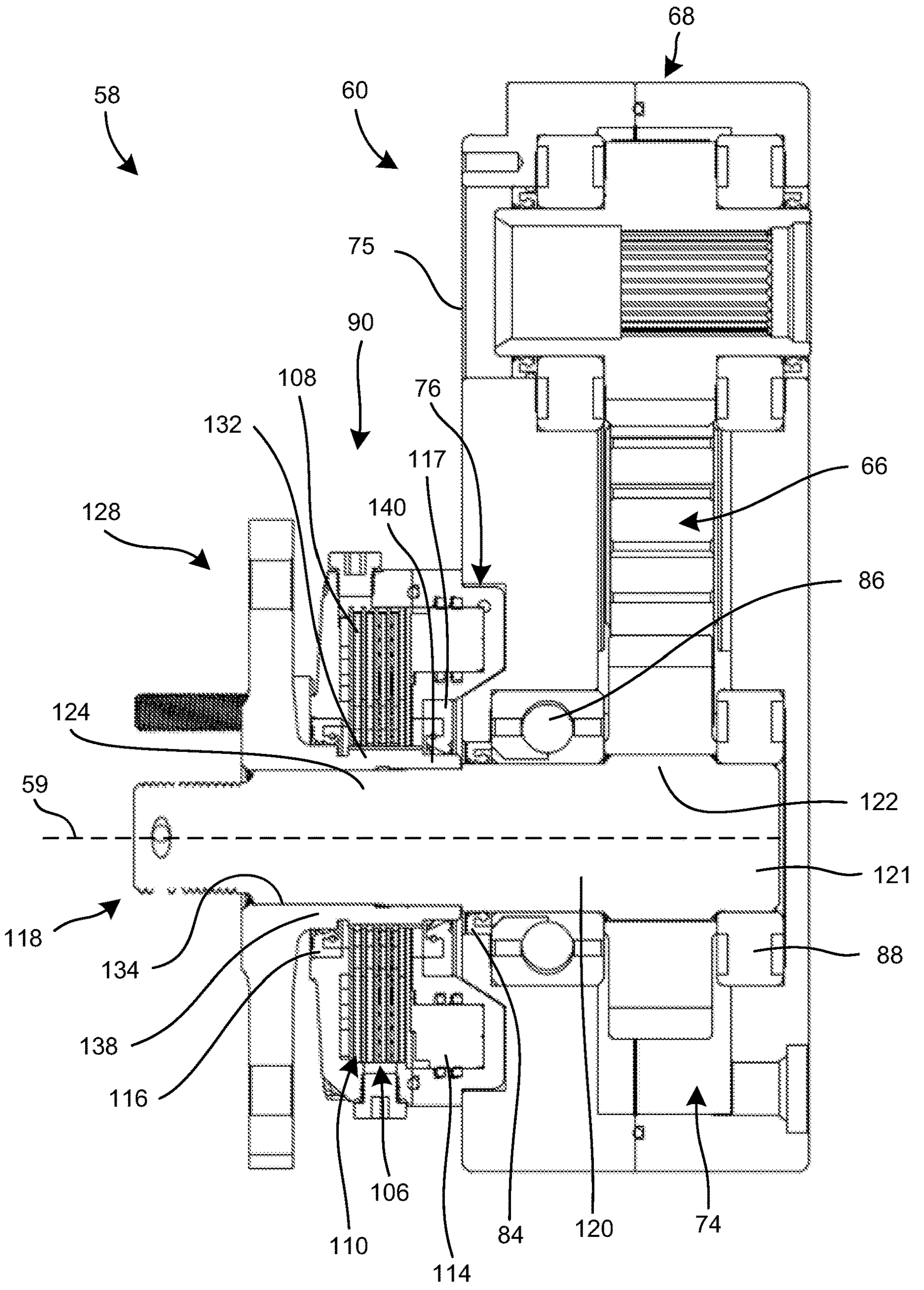
FIG. 15 is a side cross-sectional view of the FIG. 1 portal lift assembly taken along line 15-15 in FIG. 3.

Referring to FIG. 15, portal box 60 further includes front bearings 86 and rear bearings 88. Bearings 86 and 88 are configured to maintain the position of output shaft 118 while allowing output shaft 118 to rotate about output axis 59. Within interior volume 74 of portal box 60, front bearings 86 are positioned toward front side 62, and rear bearings 88 are positioned toward rear side 64. As shown, bearings 86 and 88 are positioned directly on either side of gearset 66 and first splined portion 122 of output shaft 118. By positioning bearings 86 and 88 this way, bearings 86 and 88 support gearset 66 and output shaft 118. By including bearings 86 and 88 within interior volume 74 of portal box 60, portal box 60 is configured to support and maintain the position of output shaft 118 even when brake module 90 is removed. For example, using bearings 86 and 88 to support output shaft 118 can facilitate attaching or removing brake module 90 from portal box 60. In another embodiment, portal lift assembly 58 is can include additional bearings on the other side of brake module 90 from front bearings 86 to provide additional support to output shaft 118.

As shown in FIG. 15, recess 76 on portal box 60 minimizes the overall volume of portal lift assembly 58 by receiving a portion of brake module 90. As shown, pistons 114 of brake module 90 are positioned partially within recess 76 when brake module 90 is coupled to portal box 60. Pistons 114 are positioned radially outward from front bearings 86 relative to output shaft 118. The arrangement of pistons 114 in brake module 90 allows the pistons 114 to extend partially into housing 68 of portal box 60 without affecting front bearings 86. Recess 76 is similarly positioned radially outward from front bearings 86 to receive pistons 114 of brake module 90. By accommodating pistons 114, recess 76 allows brake module 90 to extend partially into housing 68 on portal box 60. Using recess 76, housing 68 reduces the necessary space for portal lift assembly compared to flat portal box and brake housings.

Portal lift assembly 58 is configured to separate interior volume 74 of portal box 60 from interior volume 100 of brake module 90. By separating interior volume 74 and interior volume 100, portal lift assembly 58 supports a user to detach portal box 60 and brake module 90 without disrupting the internal components of portal box 60 and brake module 90. In one example, a user can remove brake module 90 from portal lift assembly 58 to replace parts, change brake fluid, and/or perform other maintenance. Portal box 60 can remain sealed and assembled during such maintenance. In another example, a user can remove part of housing 68 of portal box 60 to replace parts, change fluid, and/or perform other maintenance, and brake module 90 can remain sealed and assembled during such maintenance. Further, separating interior volume 74 of portal box 60 and interior volume 100 of brake module 90 allows portal box 60 and brake module 90 to utilize different lubricants and/or coolants.

As shown, first splined portion 122 of output shaft 118 engages gearset 66 within portal box 60. On either side of first splined portion 122, smooth portions 120 and 121 contact front bearings 86 and rear bearings 88. To seal output opening 82 of portal box 60, gasket 84 is positioned around smooth portion 120 in output opening 82. Within brake module 90, splined portion 132 of wheel hub 128 engages clutch pack 106 and output shaft 118. On either side of splined portion 132, gaskets 116 and 117 are positioned around smooth portions 138 and 140 of wheel hub 128 to seal central opening 92 of brake module 90. As shown, inner splines 134 extend along output axis 59 through central opening 92 and engage splined portion 124 of output shaft 118. Wheel hub 128 allows splined portion 124 of output shaft 118 to be positioned through central opening 92 while maintaining a seal on central opening 92. In this way, brake module 90 is generally configured to seal central opening 92 and interact with a splined output shaft 118.

Portal lift assembly 58 additionally minimizes the necessary axial length by positioning wheel hub 128 within brake module 90. Along output axis 59, the majority of wheel hub 128 is positioned within central opening 92 of brake module 90. In one example, all of wheel hub 128 is positioned within brake module 90 except for flange 142. Without a brake, a portion of wheel hub 128 would still occupy a distance along output shaft 118. With brake module 90, wheel hub 128 is positioned primarily within brake module 90 such that the distances occupied by brake module 90 and wheel hub 128 overlap. By positioning wheel hub 128 within brake module 90, portal lift assembly 58 is generally compact and supports a minimized wheel-to-wheel width of vehicle 50.

Referring to FIGS. 16 and 17, when wheel 54 is attached to portal lift assembly 58, wheel 54 and portal box 60 define a gap 144. Portal lift assembly 58 is configured to minimize gap 144 between wheel 54 and portal box 60 so as to minimize a wheel-to-wheel width of vehicle 50. Recess 76 on portal box 60 allows brake module 90 and wheel 54 to be positioned towards the interior of portal box 60 so as to minimize gap 144. Positioning wheel hub 128 in central opening 92 of brake module 90 further contributes to minimizing gap 144. In one embodiment, wheel 54 and portal box 60 define gap 144 below a threshold distance. For instance, the threshold distance can be below one centimeter. In another embodiment, wheel 54 and portal box 60 define gap 144 to be greater than or equal to a minimum clearance distance. For instance, the minimum clearance distance can be five millimeters.

Figure 18:
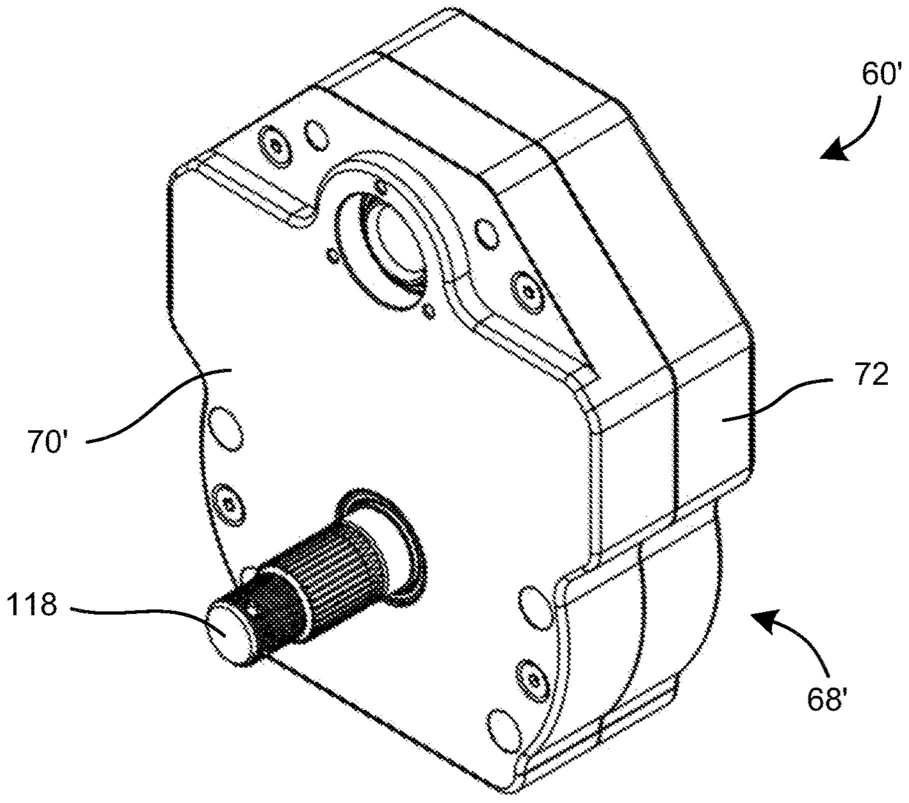
FIG. 18 is a front perspective view of an alternate embodiment of the FIG. 5 portal box.
Figure 19:
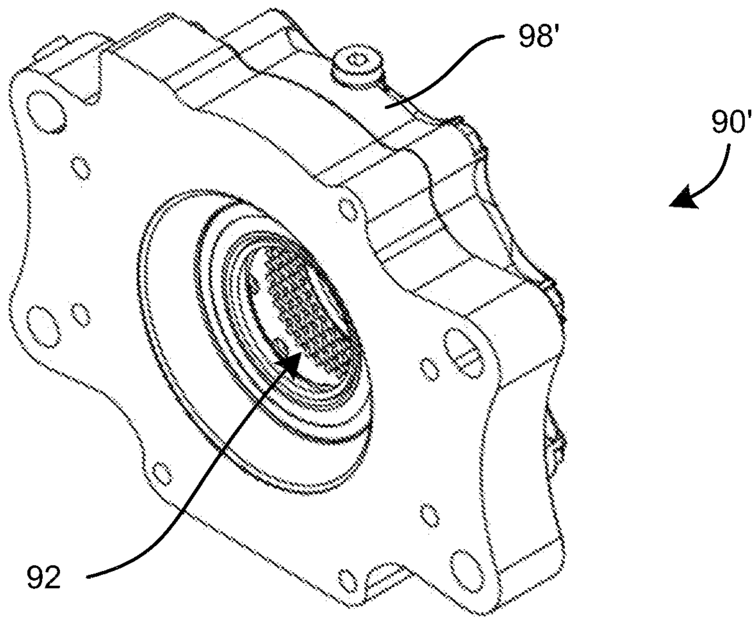
FIG. 19 is a rear perspective view of an alternate embodiment of the FIG. 8 brake module.

Referring to FIGS. 18 and 19, an alternate embodiment of portal lift assembly 58 includes a portal box 60' and a brake module 90'. As illustrated, portal box 60' includes a housing 68'. Housing 68' includes front portion 70' on front side 62 and rear portion 72 on rear side 64. Front portion 70' is configured to couple to rear portion 72 in the same way as front portion 70 in FIG. 5. Front portion 70' in FIG. 18 defines a generally flat surface on front side 62. In one embodiment, housing 68' defines interior volume 74, axle opening 80, and output opening 82 in the same way as housing 68 in FIG. 5. Further, portal box 60' includes the same gearset 66, gasket 84, front bearings 86, and rear bearings 88 as portal box 60. Output shaft 118 and gasket 84 are configured to seal output opening 82 and enclose interior volume 74 on portal box 60' in FIG. 18 in the same way as for output opening 82 and interior volume 74 on portal box 60 in FIG. 15. Portal box 60' in FIG. 18 generally functions in the same way and includes the same features as portal box 60 in FIG. 15, except that portal box 60' does not define recess 76 or sockets 78.

As illustrated in FIG. 19, brake module 90' includes a housing 98'. Housing 98' is generally flat on box side 96 so as to match housing 68' on portal box 60'. Brake module 90' is configured to couple to portal box 60' using fasteners, such as bolts and/or screws. In one embodiment, housing 98' defines central opening 92 and interior volume 100 in the same way as housing 98 in FIG. 10. Further, brake module 90' includes the same clutch pack 106, pistons 114, wheel-side gasket 116, and box-side gasket 117 as brake module 90 in FIG. 10. Wheel hub 128, wheel-side gasket 116, and box-side gasket 117 are configured to seal central opening 92 and enclose interior volume 100 on brake module 90' in FIG. 19 in the same way as for central opening 92 and interior volume 100 on brake module 90 in FIG. 15. Brake module 90' in FIG. 19 generally functions in the same way and includes the same features as brake module 90 in FIG. 15, except that housing 98' forms a flat side that does not include tabs 104.

Using portal box 60' from FIG. 18 and brake module 90' from FIG. 19, portal lift assembly 58 can separate interior volumes 74 and 100 in the same way as with portal box 60 and brake module 90 in FIG. 15. Similarly, portal box 60' and brake module 90' allow a user to perform maintenance on and/or replace one of portal box 60' and brake module 90' while leaving the other sealed and assembled. Portal box 60' and brake module 90' can be formed from the same materials as portal box 60 and brake module 90, such as aluminum and/or another rigid material. Further, portal box 60' and brake module 90' can be formed using similar techniques as portal box 60 and brake module 90, such as casting from a mold and/or machining from a solid piece of material. In one embodiment, manufacturing portal box 60' and/or brake module 90', as shown in FIGS. 18 and 19, is quicker, more reliable, and/or more efficient than manufacturing portal box 60 and/or brake module 90, as shown in FIG. 15.

Figure 20:
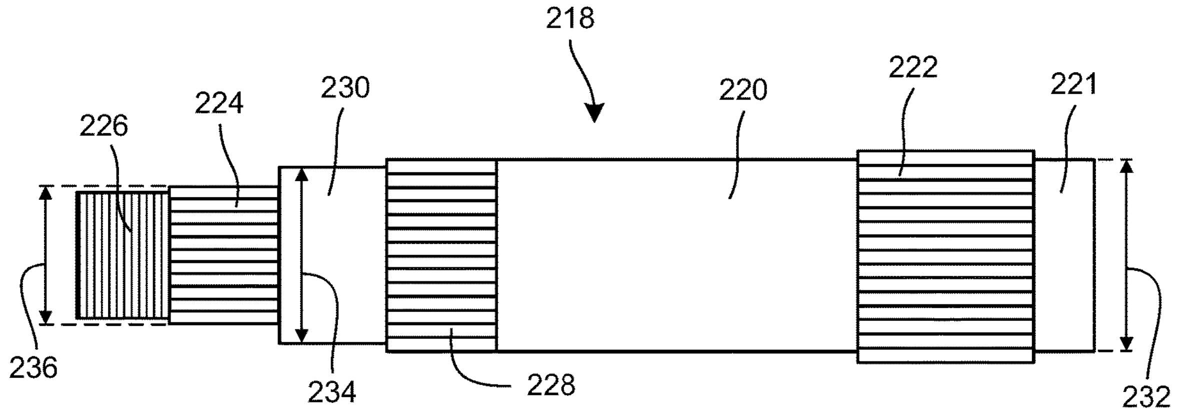
FIG. 20 is a side elevation view of an alternate embodiment of the FIG. 11 output shaft.

FIG. 20 illustrates an alternate output shaft 218. Similar to output shaft 118 in FIG. 11, output shaft 218 is configured to interact with portal box 60, brake module 90, and wheel hub 128 in portal lift assembly 58, or with one or more variations of those components. Output shaft 218 includes smooth portions 220, 221, and 230; splined portions 222, 224, and 228; and a threaded portion 226. First and second smooth portions 220 and 221 are similar to smooth portions 120 and 121 in output shaft 118 in FIG. 11. Smooth portions 220 and 221 define generally uniform exterior surfaces and define circular cross-sections so as to support output shaft 218 to rotate about output axis 59. First splined portion 222 is positioned between smooth portions 220 and 221 and is similar to first splined portion 122 on output shaft 118 in FIG. 11. First splined portion 222 includes splines that extend around a circumference of output shaft 218. Using the splines, first splined portion 222 is configured to couple to gearset 66 in portal box 60. For example, first splined portion 222 can mechanically fix output shaft 218 to an output gear of gearset 66 such that output shaft 218 and the gear rotate about output axis 59 together.

Second splined portion 224 is positioned towards an opposite end of output shaft 218 relative to first splined portion 222. Second splined portion 224 includes splines that extend around a circumference of output shaft 218. Using second splined portion 224, output shaft 218 can interface with wheel hub 128 as shown in FIG. 12 or an alternate embodiment of wheel hub 128. Second splined portion 224 can rotationally couple output shaft 218 and wheel hub 128 such that output shaft 218 and wheel hub 128 rotate about output axis 59 together.

Third splined portion 228 is positioned between first and second splined portions 222 and 224. Similar to first and second splined portions 222 and 224, third splined portion 228 includes splines that extend around a circumference of output shaft 218. Using third splined portion 228, output shaft 218 is configured to couple to brake module 90, shown in FIG. 8, or an alternate embodiment of brake module 90. Specifically, the splines of splined portion 228 can cooperate with teeth 110 on first set of plates 108 in brake module 90. The splines and teeth 110 can mechanically couple such that output shaft 218 and first set of plates 108 rotate together. In contrast to applying a brake force to output shaft 118 through wheel hub 128, as shown in FIG. 15, brake module 90 can apply braking force directly to output shaft 218 using third splined portion 228.

Third smooth portion 230 is positioned near third splined portion 228 and across from first smooth portion 220. Similar to smooth portions 220 and 221, third smooth portion 230 defines a generally uniform exterior surface and a circular cross-section so as to support rotation of output shaft 218 about output axis 59. In combination with first smooth portion 220, third smooth portion 230 supports rotation of output shaft 218 within brake module 90. Additionally, in contrast to sealing against wheel hub 128 as in FIG. 15, central opening 92 of brake module 90 can seal against smooth portions 220 and 230 of output shaft 218 to enclose interior volume 100.

As shown, smooth portion 220 defines a first shaft diameter 232, and third smooth portion 230 defines a second shaft diameter 234. In the illustrated example, first shaft diameter 232 is greater than second shaft diameter 234. Using a smaller second shaft diameter 234 relative to first shaft diameter 232, brake module 90 can be added or removed from portal lift assembly 58 without having to remove output shaft 218 from portal box 60. Additionally, third splined portion 228 can define the same or a smaller size diameter than first shaft diameter 232 so as to allow brake module 90 to slide onto output shaft 218. In the illustrated embodiment, first shaft diameter 232 is consistent along output axis 59 across smooth portions 220 and 221. In another example, one of smooth portions 220 and 221 can define a different diameter than first shaft diameter 232. For instance, first smooth portion 220 could define a larger diameter than second smooth portion 221. In yet another example, a diameter of first smooth portion 220 can vary along output axis 59. For instance, first smooth portion 220 could define a smaller diameter near first splined portion 222 and a larger diameter on near third splined portion 228.

Second splined portion 224 defines a third shaft diameter 236. Third shaft diameter 236 is smaller than second shaft diameter 234 so as to allow brake module 90 to slide onto or off of output shaft 218. Further, when wheel hub 128 is coupled to second splined portion 224, third smooth portion 230 defines a shoulder that blocks wheel hub 128 from sliding beyond second splined portion 224 because second shaft diameter 234 is larger than third shaft diameter 236.

Threaded portion 226 is positioned on the distal end of output shaft 218. Similar to threaded portion 126 on output shaft 118, shown in FIG. 11, threaded portion 226 can receive a nut. For example, a nut can screw onto threads of threaded portion 226. Coupling a nut to threaded portion 226 can limit movement between output shaft 218 and wheel hub 128 along output axis 59. Threaded portion 226 can optionally define a hole to accommodate a pin to hold the nut in place along the threads. As should be appreciated, threaded portion 226 could screw into another part, such as a portion of wheel 54.

Figure 21:
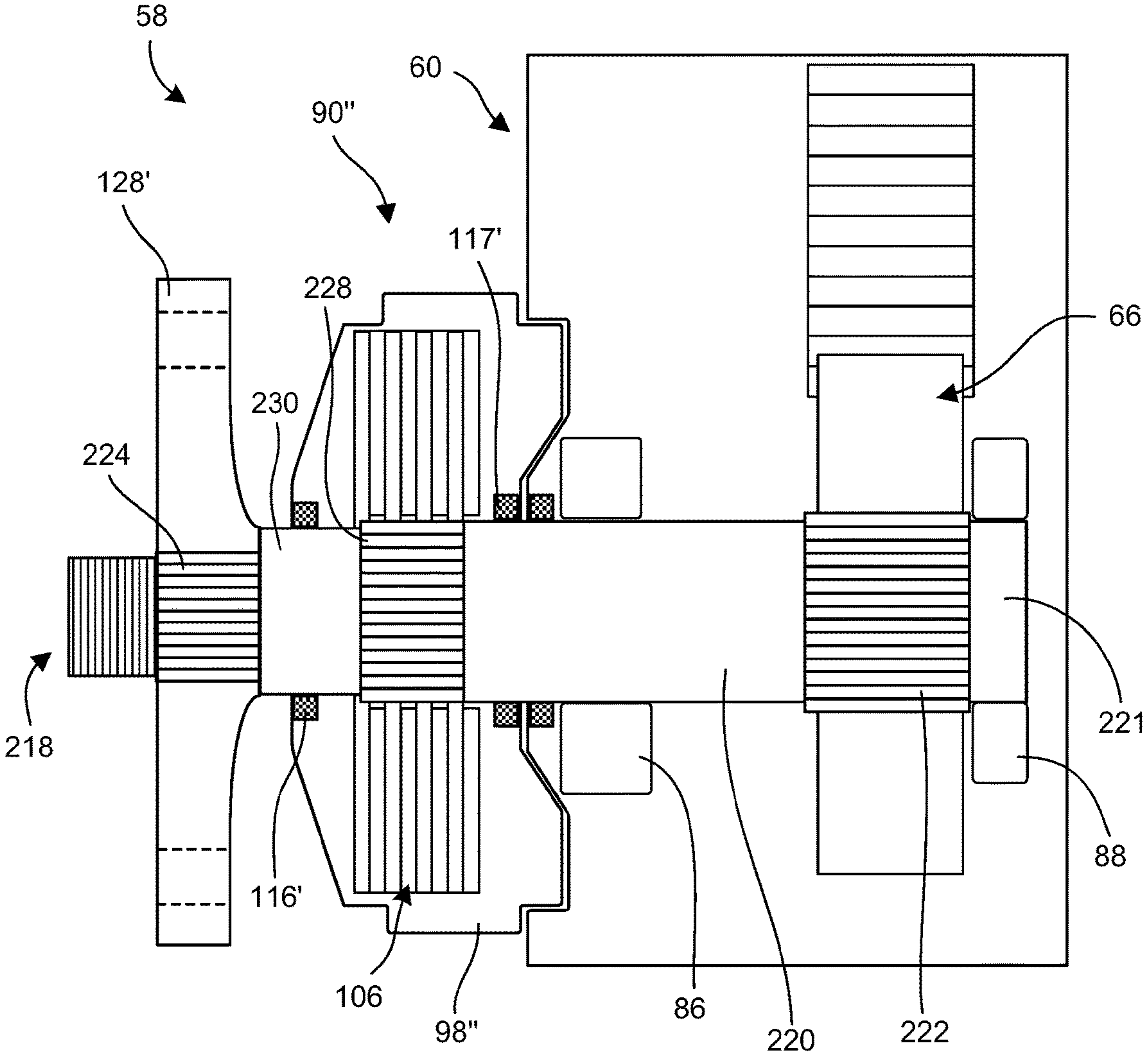
FIG. 21 is a side cross-sectional view of an alternate embodiment of the FIG. 1 portal lift assembly that includes the FIG. 20 output shaft.

Referring to FIG. 21, an alternate version of portal lift assembly 58' is illustrated. In the illustrated example, portal lift assembly 58' includes portal box 60, brake module 90", output shaft 218, and wheel hub 128'. As should be appreciated, output shaft 218 could be configured to interact with other versions of portal box 60, brake module 90, and/or wheel hub 128, such as portal box 60' in FIG. 18, brake module 90' in FIG. 19, and/or any other alternate embodiment.

In the illustrated example, output shaft 218 generally interacts with portal box 60 in a similar way as output shaft 118 in FIG. 15. When positioned through output opening 82 of portal box 60, shown in FIG. 5, output shaft 218 mechanically links to gearset 66 in portal box 60 and rotationally couples to an output gear of gearset 66. Smooth portion 220 of output shaft 218 can contact gasket 84 and/or a portion of portal box 60 to seal output opening 82. Further, front bearings 86 and rear bearings 88 contact smooth portions 220 and 221 to support rotation of output shaft 218 in portal lift assembly 58'.

Brake module 90" in FIG. 21 is another embodiment of brake module 90 shown in FIG. 8. In the illustrated example, brake module 90" includes housing 98", wheel-side gasket 116', and box-side gasket 117'. Additionally, other components in brake module 90" can be the same or similar components as in brake module 90, such as clutch pack 106, piston 114, and banjo 115. In the illustrated example, brake module 90" is configured to be positioned in recess 76 of portal box 60. As should be appreciated, portal lift assembly 58' could include brake module 90 shown in FIG. 15, brake module 90' shown in FIG. 19, or another version of brake module 90.

Housing 98" is an alternate embodiment of housing 98 shown in FIG. 8. As illustrated in FIGS. 8 and 9, housing 98 can define a larger diameter for central opening 92 on wheel side 94 compared to box side 96. Accordingly, wheel-side gasket 116 can be larger in diameter than box-side gasket 117. As shown in FIG. 15, central opening 92 is larger on wheel side 94 than on box side 96 to allow wheel hub 128 to be inserted into brake module 90 from wheel side 94. Conversely, housing 98" in FIG. 21 can define a central opening 92 that is larger on box side 96 than on wheel side 94. Box-side gasket 117' can therefore be larger than wheel-side gasket 116' in FIG. 21. Using a larger opening on box side 96 compared to wheel side 94, brake module 90" can slide onto output shaft 218 from box side 96 without having to remove output shaft 218 from portal box 60. In the illustrated example, brake module 90" can receive first smooth portion 220, third splined portion 228, and third smooth portion 230 of output shaft 218 from box side 96. However, first smooth portion 220 and third splined portion 228 are too large to pass through wheel side 94 of brake module 90".

Using gaskets 116' and 117', brake module 90" is configured to seal around output shaft 218. As illustrated, first smooth portion 220 can contact box-side gasket 117' and/or a portion of brake module 90" to seal central opening 92 on box side 96. Third smooth portion 230 can contact wheel-side gasket 116' and/or a portion of brake module 90" to seal central opening 92 on wheel side 94. In this way, brake module 90" can receive output shaft 218 from box side 96 and can seal around output shaft 218 on both wheel side 94 and box side 96. As illustrated, first smooth portion 220, third splined portion 228, and third smooth portion 230 of output shaft 218 can pass through box-side gasket 117' into brake module 90". First smooth portion 220 can be positioned against box-side gasket 117' to seal brake module 90" on box side 96. Adjacent to first smooth portion 220, third splined portion 228 can couple to first set of plates 108 of clutch pack 106. On wheel side 94, third smooth portion 230 can pass through clutch pack 106 and be positioned against wheel-side gasket 116' to seal brake module 90". In this way, brake module 90" can maintain a seal on each side of splined portion 228, and splined portion 228 can couple to first set of plates 108 in clutch pack 106.

Wheel hub 128' in FIG. 21 is an alternate version of wheel hub 128 shown in FIG. 12. Similar to wheel hub 128 shown in FIG. 12, wheel hub 128' in FIG. 21 is configured to couple wheel 54 to output shaft 218. Wheel hub 128' in FIG. 21 can couple to second splined portion 224 of output shaft 218, but in the illustrated example, wheel hub 128' is not configured to seal brake module 90". Because output shaft 218 can seal brake module 90", wheel hub 128' can couple to output shaft 218 without extending into brake module 90". Third smooth portion 230 is configured to limit the distance wheel hub 128' can slide when coupling to second splined portion 224.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

The invention claimed is:

1. A portal lift assembly for a vehicle having an axle and a wheel, the portal lift assembly comprising:

a portal box comprising a gearset and a housing, wherein said housing defines an input opening on a first side configured to receive the axle, wherein said housing defines an output opening on a second side, and wherein said gearset is configured to receive and mechanically link to the axle;

an output shaft configured to mechanically link to said gearset such that said gearset mechanically links said output shaft to the axle, wherein said output opening of said portal box is configured to receive said output shaft;

a wheel hub that is configured to couple to said output shaft, wherein said wheel hub is configured to couple to the wheel; and a brake module comprising a plate, an internal volume and a brake module housing, wherein said plate is coupled to said output shaft to rotate with said output shaft, wherein said brake module is configured to mount to said portal box and to selectively apply a braking force to said plate that resists rotation of the output shaft relative to the brake module housing, wherein said brake module defines a central opening from a first side through to a second side of said brake module; and a seal on the brake module that fluidly seals the internal volume of said brake module while allowing rotations of the output shaft relative to the brake module housing;

wherein an interior volume of said portal box that includes said gearset is fluidly sealed from the internal volume of said brake module.

2. The portal lift assembly of claim 1, wherein said central opening of said brake module is configured to receive said wheel hub and wherein said brake module and said wheel hub together define the seal that fluidly seals the internal volume of said brake module while allowing rotations of the wheel hub relative to the brake module housing.

3. The portal lift assembly of claim 1, wherein said central opening of said brake module is configured to receive said output shaft and wherein said brake module and said output shaft together define the seal that fluidly seals the internal volume of said brake module while allowing rotations of the wheel hub relative to the brake module housing.

4. The portal lift assembly of claim 1, wherein said housing of said portal box defines a recess, and wherein said recess is configured to receive a portion of said brake module housing.

5. The portal lift assembly of claim 4, wherein said recess of said portal box is shaped so as to engage the portion of said brake module to resist rotation of the brake module housing relative to said portal box when the portion of said brake module is positioned in said recess.

6. The portal lift assembly of claim 5, wherein said recess defines a socket and said brake module housing comprises a tab, and wherein said socket is configured to receive said tab.

7. The portal lift assembly of claim 4, wherein said portal box defines an edge on said second side of said portal box, and wherein an internal component of said brake module is at least partially positioned beyond said edge toward said first side of said portal box when said brake module is coupled to said portal box.

8. The portal lift assembly of claim 7, wherein said brake module comprises a piston configured to selectively engage the plate in said brake module, and wherein said piston extends past said edge toward said first side of said portal box when said brake module is coupled to said portal box.

9. The portal lift assembly of claim 1, wherein said output shaft comprises a first splined portion and a second splined portion, wherein the first splined portion rotationally engages said output shaft relative to said gearset and wherein said second splined portion rotationally engages said output shaft relative to said wheel hub.

10. The portal lift assembly of claim 9, wherein said wheel hub comprises a third splined portion, a first smooth portion and a second smooth portion, wherein the third splined portion is positioned between the first and second smooth portions, wherein the third splined portion rotationally engages the plate relative to said wheel hub.

11. The portal lift assembly of claim 10, wherein said brake module housing further comprises a first and second seal that seal against the first and second smooth portions of said wheel hub to fluidly seal the internal volume of said brake module while allowing rotations of the wheel hub relative to the brake module housing.

12. An assembly comprising:

a vehicle comprising a wheel and an axle; and the portal lift assembly of claim 1; and wherein said wheel and said portal box define a longitudinal gap between each other when said wheel hub is coupled to said portal lift assembly, and wherein said longitudinal gap is below one centimeter.

13. The assembly of claim 12, wherein said longitudinal gap is below five millimeters.

14. A portal lift assembly for a vehicle having an axle and a wheel, the portal lift assembly comprising:

a portal box comprising a gearset and a housing, wherein said housing defines an input opening on a first side configured to receive the axle and a recess on a second side, wherein said housing defines an output opening on said second side, and wherein said gearset is configured to receive and mechanically link to the axle;

an output shaft configured to mechanically link to said gearset such that said gearset mechanically links said output shaft to the axle, wherein said output opening on said portal box is configured to receive said output shaft;

a wheel hub comprising a flange configured to couple to the wheel, wherein said wheel hub is configured to receive and couple to said output shaft;

a brake module comprising a brake module housing, a first plate rotationally coupled to said wheel hub and a second plate rotationally coupled to said brake module housing, wherein said brake module defines an internal volume, wherein said brake module is configured to mount to said portal box and to selectively apply a braking force to said first and second plates that resists rotation of the output shaft relative to the brake module housing; and wherein the recess on the portal box is configured to receive said brake module housing such that at least a portion of an internal component of said brake module is positioned through an edge of said portal box on said second side towards said first side of said portal box when said brake module is coupled to said portal box; and wherein an interior volume of said portal box that includes said gearset is fluidly sealed from the internal volume of said brake module.

15. The portal lift assembly of claim 14, wherein said recess is shaped so as to lock said brake module from rotating relative to said portal box when said brake module is positioned within said recess.

16. The portal lift assembly of claim 15, wherein said recess defines a socket and said brake module includes a tab, and wherein said socket is configured to receive said tab.

17. The portal lift assembly of claim 14, wherein said wheel hub includes a first smooth portion and a second smooth portion, wherein said first smooth portion is configured to seal a central opening on said first side of said brake module, and wherein said second smooth portion is configured to seal said central opening on said second side of said brake module.

18. The portal lift assembly of claim 17, wherein said output shaft includes a splined portion, wherein said wheel hub includes inner splines in a shaft opening, wherein said inner splines are configured to interface with said splined portion of said output shaft, and wherein said inner splines and said splined portion extend through said central opening of said brake module when said wheel hub is coupled to said output shaft and said brake module.

19. The portal lift assembly of claim 14, wherein said brake module comprises a piston configured to selectively engage the first and second plates in said brake module, and wherein said piston extends past said edge toward said first side of said portal box when said brake module is coupled to said portal box.

20. The portal lift assembly of claim 14, wherein said output shaft comprises a first splined portion and a second splined portion, wherein the first splined portion rotationally engages said output shaft relative to said gearset, and wherein said second splined portion rotationally engages said output shaft relative to said first plate in said brake module.

21. The portal lift assembly of claim 20, wherein said output shaft includes a first smooth portion and a second smooth portion, wherein said first smooth portion is configured to seal said a central opening on said first side of said brake module, and wherein said second smooth portion is configured to seal said central opening on said second side of said brake module.

* * * * *